(12) United States Patent
Solovyov et al.

(10) Patent No.: US 8,034,739 B2
(45) Date of Patent: Oct. 11, 2011

(54) METHOD FOR SELECTING ADSORPTIVE COMPOSITE BARRIERS FOR PACKAGING APPLICATIONS

(75) Inventors: Stanislav E. Solovyov, Getzville, NY (US); Thomas Powers, Mayville, NY (US); Samuel A. Incorvia, North Tonawanda, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 850 days.

(21) Appl. No.: 12/079,801

(22) Filed: Mar. 28, 2008

(65) Prior Publication Data
US 2008/0251760 A1   Oct. 16, 2008

Related U.S. Application Data

(60) Provisional application No. 60/909,247, filed on Mar. 30, 2007, provisional application No. 60/908,841, filed on Mar. 29, 2007.

(51) Int. Cl.
*B01J 20/26* (2006.01)
(52) U.S. Cl. ........................ 502/402; 502/526
(58) Field of Classification Search .................. 502/400, 502/401, 402, 439, 526
See application file for complete search history.

(56) References Cited

U.S. PATENT DOCUMENTS

| 5,078,909 A | 1/1992 | Shigeta et al. |
| 5,911,937 A | 6/1999 | Hekal |
| 6,130,263 A | 10/2000 | Hekal |
| 6,161,765 A | 12/2000 | Kay et al. |
| 6,194,079 B1 | 2/2001 | Hekal |
| 6,214,255 B1 | 4/2001 | Hekal |
| 7,595,278 B2 | 9/2009 | Powers et al. |
| 2006/0166818 A1 | 7/2006 | Powers et al. |
| 2006/0166819 A1 | 7/2006 | Powers et al. |
| 2008/0207441 A1 | 8/2008 | Incorvia et al. |

OTHER PUBLICATIONS

Frisch, H.L., "The Time Lag in Diffusion", J. Phys. Chem. 61, pp. 93-95 (1957).
Siegel, Ronald et al., "Reactive barrier membranes: some theoretical observations regarding the time lag and breakthrough curves", J. Membr. Sci. 229, pp. 33-41 (2004).
Solovyov, Stanislav, "Determining the Rate Constant of Diffusion-Controlled Oxygen Scavenging Reaction in Polymer Membranes by Transient Permeability Measurements", J. Phys. Chem. B. 108, pp. 15618-15630 (2004).
Solovyov, Stanislav, "Reactivity of Gas Barrier Membranes Filled with Reactive Particulates", J. Phys. Chem. B 110, pp. 17977-17986 (2006).
Paul, D.R. et al., "The Diffusion Time Lag in Polymer Membranes Containing Adsorptive Fillers", J. Polym. Sci. Symp. 41, pp. 79-93 (1973).
Yang, et al., "Reactive Barrier Films", Aiche Journal 47-2, pp. 295-302 (2001).

*Primary Examiner* — Edward M Johnson
(74) *Attorney, Agent, or Firm* — Simpson & Simpson, PLLC

(57) ABSTRACT

A method of selecting an appropriate resin bonded sorbent composition which may be used at least for in part making an enclosure to protect contents from external humidity including the steps of: a) selecting a plurality of resins, a plurality of sorbents and a plurality of ratios therebetween to form a plurality of composites; b) calculating a plurality of failure times for the plurality of composites, wherein each failure time of the plurality of failure times is based on when an internal relative humidity of each composite of the plurality of composites is equal to the maximum internal relative humidity; c) determining which of the plurality of failure times is greater; and, d) selecting one composite of the plurality of composites based on the result of step (c).

11 Claims, 7 Drawing Sheets

METHOD FOR SELECTING ADSORPTIVE COMPOSITE BARRIERS FOR PACKAGING APPLICATIONS

CROSS-REFERENCE TO RELATED APPLICATIONS

This patent application claims the benefit under 35 U.S.C. §119(e) of U.S. Provisional Application No. 60/908,841, filed Mar. 29, 2007, and U.S. Provisional Application No. 60/909,247, filed Mar. 30, 2007, which applications are incorporated herein by reference.

FIELD OF THE INVENTION

The invention broadly relates to packaging materials, more specifically to adsorptive composite barriers for packaging applications, and even more particularly to a method for selecting the materials and composition thereof for adsorptive composite barriers for packaging applications.

BACKGROUND OF THE INVENTION

Polymer-based composites filled with inorganic particulates have long been used for improving mechanical properties of thermoplastic and thermoset polymers. Composites loaded with moisture absorbers have been also proposed for the purpose of making desiccating liners and other internal parts of thermoplastic containers and controlling humidity in such containers, e.g., U.S. Pat. No. 6,130,263. Multiple electronic, automotive, pharmaceutical, diagnostic, and food packaging applications require very low humidity levels inside the package or encapsulated enclosure to protect moisture-sensitive products or components from exposure to environmental humidity. Increasingly, electronics and automotive electronics are shifting from the use of metal die castings for housings and components to the use of thermoplastics. This transition is fueled by the need to reduce weight and cost in an ever increasing competitive environment. Resulting from the rapid development pace of these applications, the selection process of thermoplastic resins often does not give consideration to the water vapor transport properties of such resins which directly impact the service life of the components or device. In conjunction with this trend is the miniaturization of components or devices which leaves little or no space for enclosed sorbents which results in inadequate or no moisture protection whatsoever. Currently, the selection and use of thermoplastics exhibiting the best passive moisture barrier characteristics often falls short of providing protection from moisture ingress over the desired service life of the component or device. Heretofore, enclosures of this type have essentially failed to provide a sufficient performance regarding prevention of moisture ingress.

Several U.S. patents focus on improving moisture transport into the desiccant-loaded composite in order to accelerate the desiccating effect of such composites by rapidly removing moisture from inside the package, especially when used as an interior part of the container. See, for example, U.S. Pat. Nos. 5,911,937; 6,130,263; 6,194,079; and, 6,214,255. The devices are inadequate for many described needs as they fail to prevent moisture ingress, but merely absorb moisture after it has entered an enclosure during packaging operations, during service time of a device or after opening of resealable containers.

Since all plastic materials are permeable to atmospheric gases and water vapor, plastics are unable to provide a moisture-free environment inside any package or enclosure made therefrom, for significant periods of time. Heretofore, controlling permeated moisture, i.e., moisture which has already entered an enclosure, has been the primary motivation for developing moisture-absorbing composites. An alternative approach to removing moisture that has already permeated into a package is to improve the moisture barrier properties of the packaging polymeric material itself. Dispersing a water absorber in a thermoplastic polymer resin allows the creation of a composite that acts as an active barrier to water vapor permeation. Active barriers intercept and remove moisture diffusing across the barrier via physical and/or chemical means. Such barriers allow for the reduction or complete elimination of moisture permeation into the package for significant time durations. See, for example, U.S. patent application Ser. Nos. 11/040,471; 11/335,108; and 11/635,750, which applications are incorporated herein by reference in their entirety.

In composite barriers filled with moisture adsorbing additives, the sorbent additive distributed in the polymeric matrix can cause a significant delay, known in the art as a diffusive lag time of a barrier layer, before moisture starts to penetrate into a package, which is often several orders of magnitude longer than the delay observed in barriers made from neat resins. Although the calculation of the lag time for neat resins and resin/sorbent composite barriers is described in the DETAILED DESCRIPTION OF THE INVENTION below, it should be appreciated that these calculations are well known in the art. These lag time calculations have been used as a determinant of enclosure failure. In other words, once the lag time is reached, the enclosure is assumed to have failed since unimpeded moisture permeation across the barrier is presumed to proceed thereafter. Contrarily, it has been found that this assumption is incorrect for certain types of sorbent materials and barrier compositions. For example, for a period of time after reaching the lag time, an enclosure may be maintained below a relative humidity of 10-50%, and provided that the contents of the enclosure are not deteriorated and/or damaged by such relative humidity levels, the enclosure has not failed by merely reaching the lag time. Thus, it is advantageous to understand how an enclosure performs after reaching the lag time.

As can be derived from the variety of devices and methods directed at producing moisture adsorbing polymers used for either providing an active barrier or for absorbing existing moisture from within an enclosure, many means have been contemplated to accomplish the desired end, i.e., protection of a moisture sensitive component from degradation, thereby prolonging the service life of the component. Heretofore, tradeoffs between material selection and mix ratios were required, and as described, such determinations were made without fully understanding their effects. Thus, there is a long-felt need for a method of selecting the polymer resins, sorbents and mixtures ratios thereof to achieve specific design and performance targets. There is a further long-felt need for a means to accurately predict the effects of polymer resin, sorbent and mixture ratio thereof selections. In view of the foregoing, the present invention permits improving moisture barrier properties of packaging articles rather than merely understanding the rate of moisture sorption therein. Furthermore, the present invention moisture barrier provides effective barrier characteristics at the point of moisture ingress thereby preventing or minimizing moisture permeation, rather than providing for the removal of moisture after it reaches the interior of an enclosure.

BRIEF SUMMARY OF THE INVENTION

The present invention broadly comprises a method of selecting an appropriate resin bonded sorbent composition which may be used at least for in part making an enclosure to protect contents from external humidity, wherein the enclosure has an internal headspace volume V, a thickness L and a surface area A, the enclosure surrounded by an environment having an external relative humidity $h_{out}$ which is a fraction of a saturated water vapor density $\rho_{sat}$ in an air at a temperature T, the internal volume having a maximum internal relative humidity signifying an end point of moisture barrier protection, the method comprising the steps of: a) selecting a plurality of resins, a plurality of particulate sorbents and a plurality of ratios therebetween to form a plurality of composites and a plurality of composite layer thicknesses, wherein each resin of the plurality of resins has an effective water vapor diffusivity $D_m$ and a water vapor solubility coefficient $S_m$ and each composite of the plurality of composites has a volume fraction of the resin $\phi_m$ and a volume fraction of the sorbent $\phi_d$; b) calculating a plurality of failure times for the plurality of composites and the plurality of composite layers, wherein each failure time of the plurality of failure times is based on when an internal relative humidity $h_{in}$ of each composite of the plurality of composites is equal to the maximum internal relative humidity; c) determining which of the plurality of failure times is greater; and, d) selecting one composite of the plurality of composites and one composite layer thickness based on the result of step (c). It is also understood that the thickness range of a composite layer comprising an enclosure is often affected by other enclosure design considerations, for example, mechanical and electrical properties, weight, materials and manufacturing costs. Therefore, selecting one optimal composite in step (d) can be made to satisfy the specified enclosure wall thickness constraints.

In some embodiments, each particulate sorbent of the plurality of particulate sorbents is stoichiometric and irreversible with respect to sorbed water vapor amount and each composite of the plurality of composites has a stoichiometric coefficient μ, an initial mass concentration $R_0$ and a concentration $C_{out}$ of water vapor dissolved at an external surface of the enclosure or of a composite layer, the internal relative humidity evolution after a lag time $t_{LR}$ is calculated according to the equation:

$$h_{in}(t) = h_{out}\left[1 - \exp\left(-\frac{\phi_m D_m S_m A(t - t_{LR})}{L\left(\rho_{sat}V + \frac{1}{2}\phi_m S_m AL\right)}\right)\right],$$

wherein: t is a time to reach the internal relative humidity $h_{in}$; and, $t_{LR}$ is the lag time of the enclosure having the thickness L. In these embodiments, the lag time is calculated according to the equation:

$$t_{LR} = \frac{L^2}{6D_m}(1 + 3\Psi),$$

wherein:

$$\Psi = \frac{\mu R_0}{C_{out}}.$$

While in other embodiments, each particulate sorbent of the plurality of particulate sorbents is reversible with respect to water vapor adsorption and has a water vapor sorption isotherm, said water vapor isotherm is linear having a constant water vapor solubility coefficient $S_d$ and a pseudo stoichiometric coefficient μ which describes the maximum equilibrium adsorbed water amount per unit weight of sorbent in contact with saturated water vapor, and each composite of the plurality of composites has an initial mass concentration $R_0$ of the said sorbent and a concentration $C_{out}$ of water vapor dissolved at an external surface, the internal relative humidity evolution after a lag time $t_{LL}$ is calculated according to the equation:

$$h_{in}(t) = h_{out}\left[1 - \exp\left(-\frac{\phi_m D_m S_m A(t - t_{LL})}{L\left(\rho_{sat}V + \frac{1}{2}S_{eff}AL\right)}\right)\right],$$

wherein: t is a time to reach the internal relative humidity $h_{in}$;

$t_{LL}$ is the lag time of the enclosure having the thickness L; and, $S_{eff} = \phi_m S_m + \phi_d S_d$.

In these embodiments, the lag time is calculated according to the equation:

$$t_{LL} = \frac{L^2}{6D_m}(1 + \Psi h_{out}),$$

wherein:

$$\Psi = \frac{\mu R_0}{C_{out}}.$$

While in still other embodiments, each particulate sorbent of the plurality of particulate sorbents has a water vapor sorption isotherm, the water vapor sorption isotherm is a dual sorption mode with a hole saturation constant $C_{max}$, a Langmuir affinity constant b, and the internal volume has an initial internal relative humidity $h_{in,0}$, the internal relative humidity evolution after a lag time $t_{LD}$ is calculated according to the equation:

$$t = t_{LD} + \frac{a_1 a_3}{a_5(1 + bh_{out})}\left[\ln\frac{1 + bh_{in}}{1 + bh_{in,0}} - \ln\frac{h_{out} - h_{in}}{h_{out} - h_{in,0}} - \ln(1 + bh_{out})\left(\frac{1}{1 + bh_{in}} - \frac{1}{1 + bh_{in,0}}\right)\right] - \frac{a_2 a_3 + a_4}{a_5}\ln\frac{h_{out} - h_{in}}{h_{out} - h_{in,0}},$$

wherein: t is a time to reach the internal relative humidity $h_{in}$;

$t_{LD}$ is the lag time of the enclosure having the thickness L;

$a_1 = \phi_d C_{max} b$;

$a_2 = \phi_m S_m$;

$a_3 = \frac{AL}{2}$;

$a_4 = \rho_{sat}V$;

and, $a_5 = \frac{\phi_m D_m S_m A}{L}$.

In these embodiments, the lag time is calculated according to the equation:

$$t_{LD} = \frac{L^2}{6D_m}\left(1 + \frac{\phi_d}{\phi_m}\frac{C_{max}b}{S_m}\frac{6}{y^3}\left[\frac{1}{2}y^2 + y - (1+y)\ln(1+y)\right]\right),$$

wherein: $y = bh_{out}$.

In yet other embodiments, the resin bonded sorbent composition is formed with the aid of a coupling agent or a compatibilizing agent, wherein the coupling agent or compatibilizing agent is chemically compatible with each resin of the plurality of resins and improves adhesion or coupling of the sorbent particles with each resin of the plurality of resins. In some of these embodiments, the coupling or compatibilizing agent is selected from the group consisting of reactive and non-reactive agents, while in some these embodiments, the compatibilizing agent is selected from the group consisting of a metal, a metal oxide, an acrylate, a stearate, a block copolymer, a maleate, an epoxy, a silane, a titanate, an organometallic ligand and mixtures thereof. In still yet other embodiments, the resin bonded sorbent composition is compounded in a twin screw extruder.

The present invention broadly comprises an article of manufacture constructed from a resin bonded sorbent composition, wherein the resin bonded sorbent composition is made according to the method described above. In some embodiments, the resin bonded sorbent composition includes from about two weight percent (2 wt. %) to about fifty-five weight percent (55 wt. %) sorbent and from about forty-five weight percent (45 wt. %) to about ninety-eight weight percent (98 wt. %) resin, while in other embodiments, the resin bonded sorbent composition includes from about twenty-five weight percent (25 wt. %) to about fifty-five weight percent (55 wt. %) sorbent and from about forty-five weight percent (45 wt. %) to about seventy-five weight percent (75 wt. %) resin, and in still yet other embodiments, the resin bonded sorbent composition includes from about thirty-five weight percent (35 wt. %) to about forty-two weight percent (42 wt. %) sorbent and from about fifty-eight weight percent (58 wt. %) to about sixty-five weight percent (65 wt. %) resin. In yet other embodiments, the resin bonded sorbent composition includes a resin and a particulate sorbent and essentially all particles of the particulate sorbent are separated by the resin matrix.

The present invention also broadly comprises a multi-layer barrier structure having at least one layer, wherein the at least one layer includes a resin bonded sorbent composition made according to the method described above.

It is a general object of the present invention to provide a method of selecting the resin, sorbent and ratio therebetween for the construction of a resin bonded sorbent active barrier.

It is another general object of the present invention to maximize the useful life of an enclosure based on the enclosure active barrier characteristics and the requirements of the contents enclosed therein.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
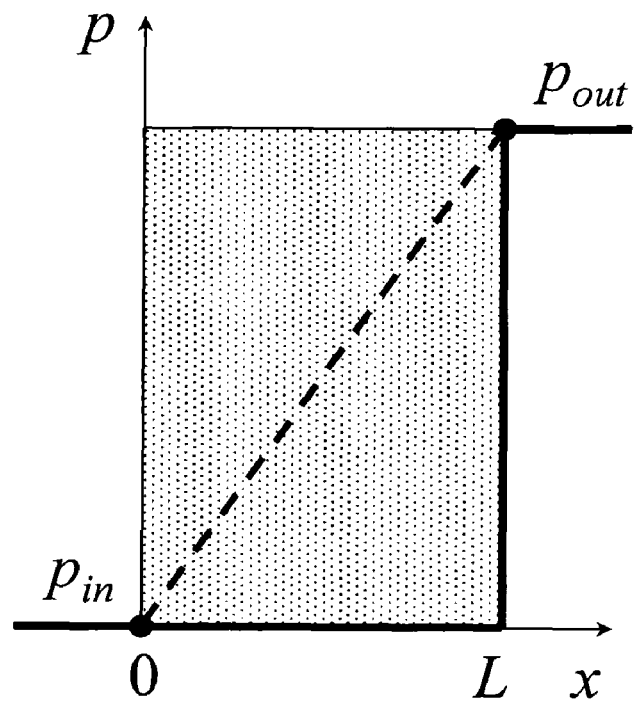
FIG. 1 is a graph of a water vapor pressure profile in a passive membrane for a reference (solid line) and steady-state (dashed line) permeation conditions.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "enclosure" is synonymous with terms such as "packaging", "container", etc., and such terms may be used interchangeably as appearing in the specification and claims. Although any methods, devices or materials similar or equivalent to those described herein can be used in the practice or testing of the invention, the preferred methods, devices, and materials are now described.

Unlike the enclosed desiccants and internal desiccating layers designed for rapid removal of moisture trapped inside a package/enclosure after sealing, as described above, the desiccating barrier composites of the present invention are designed to primarily prevent moisture permeation through the packaging article, i.e., enclosure, for the longest possible time. Moisture removal from the package interior is also observed during use of such barrier structures, although the rate of such removal may be rather slow, and improving the sorption rate in the interior of the enclosure does not form a part of the present invention. In order to reduce the rate of moisture permeation through a polymer-based composite packaging/enclosure, e.g., a resin bonded sorbent enclosure, and delay the attainment of a steady state permeation pattern across the barrier wall thickness, the present invention uses the method described below to select the composite materials, ratios therebetween and filler incorporation procedures.

As described supra, polymeric composites filled with moisture adsorptive fillers can serve as effective long-lasting moisture barriers in packaging applications. Transient performance of such barriers is described in terms of the diffusive lag time and transient effective permeation rates into a contained environment after the lag time. Although calculation of diffusion lag times is well known in the art, determination of transient effective permeation rates has heretofore not been accomplished. Analytical results for irreversible stoichiometric absorbers as well as Fickian (linear) and dual mode water sorption isotherms of polymer matrices and fillers are described herebelow, and serve as a model of transient permeation data and moisture build-up kinetics inside a sealed package. Critical composite barrier design features and ways of improving transient barrier performance are also discussed herein.

The performance of permeable polymeric barriers to gas and water vapor permeation is routinely characterized by two steady state transport properties: the steady state transmission rate (permeance), $TR^{SS}$, and the reference time lag $t_L$. $TR^{SS}$ is the flow rate of permeant across a unit barrier area A normalized to the gas pressure difference $\Delta p$ in the separated environments. Flow rate of water vapor permeant is expressed in units of moles per meters squared per second (mol/(m² s) or grams per meters squared per second (g/(m² s)), while flow rate of gas permeants are expressed in units of moles per meters squared per second per Pascals (mol/(m² s Pa)) or in units of cubic centimeters at standard temperature and pressure per meters squared per seconds per Pascals (cm³(STP)/(m²s Pa)). Alternatively, for water vapor transport, the permeance is often expressed in units of grams per meters squared per day per difference in relative humidity (g/(m² day ΔRH)), at a specific temperature and relative humidity difference (ΔRH), i.e., the difference of relative humidity on opposite sides of the barrier membrane kept at the same fixed temperature. The time lag can be determined as a response time to a sudden change in external relative humidity for any initial conditions within the membrane, or in other words, an asymptotic delay before establishing a steady-state flow pattern of permeant. The reference lag time of the initially degassed barrier membrane with water vapor pressure downstream maintained at zero is commonly reported as the time lag value $t_L$. (See FIG. 1). As shown in FIG. 1, an initial reference water vapor pressure profile is depicted for a passive membrane by the solid line and for a steady-state permeation condition by the dashed line.

It should be appreciated that after the time lag the relative humidity in the contained environment will continuously increase eventually reaching equilibrium with the external environment. Since the temperature in the external environment can vary seasonally and during day-night cycles, there is always a potential for water vapor condensation inside the contained volume upon a temperature drop. As described supra, condensation can cause corrosion of encapsulated electronic components, shorting of electric circuits and other undesirable effects. A desiccating polymeric structure selected and/or optimized according to the present invention acts as a long lasting barrier to moisture permeation and thus dramatically increase the service time of a packaged device.

As set forth above, the present invention comprises several steps to determine and select the optimal polymer resin, sorbent material and ratio therebetween. First, we discuss non-swelling polymeric barriers, i.e., examples of resins which do not allow water condensation within the matrix and which may be considered with the present invention. Although the polymer barriers do not include sorbent material, the barriers still absorb moisture as described herebelow. In the following embodiments, a uniformly thick solid polymeric barrier membrane is considered. Boundary conditions at an inner membrane surface, i.e., inside a package, is fixed at a relative humidity $h_{in}$ and an outer membrane surface, i.e., outside the package, is fixed at a relative humidity $h_{out}$. It should be appreciated that $h_{in}$ is equivalent to the ratio between the water vapor density inside the package at temperature T, i.e., $\rho_{in}$, and the saturated water vapor density at temperature T, i.e., $\rho_{sat}$, while $h_{out}$ is equivalent to the ratio between the water vapor density outside the package at temperature T, i.e., $\rho_{out}$, and $\rho_{sat}$. Additionally, each membrane corresponds to a fixed partial pressure of water vapor of $p_{in}$ and $p_{out}$, respectively, relative to a saturated water vapor pressure $p_{sat}$ a specified temperature T.

$$h_{in}(T) \equiv \frac{\rho_{in}(T)}{\rho_{sat}(T)}(\times 100\%) \approx \frac{p_{in}(T)}{p_{sat}(T)}(\times 100\%) \quad (1)$$

$$h_{out}(T) \equiv \frac{\rho_{out}(T)}{\rho_{sat}(T)}(\times 100\%) \approx \frac{p_{out}(T)}{p_{sat}(T)}(\times 100\%) \quad (2)$$

Subsequently, temperature dependent saturation water vapor density $\rho_{sat}(T)$ is used to determine the amount of water $m_{in}$ in the package having an internal headspace volume V.

$$m_{in} = h_{in}\rho_{sat}V \quad (3)$$

It should be appreciated that internal headspace volume V is intended to mean all volume within a package or enclosure which is not filled with components, materials or any objects contained within the package.

Analogous to a solubility coefficient S of non-condensing gases in polymers, the water vapor solubility coefficient $S_m$ in polymeric matrices can be expressed as a mass $m_w$ of water dissolved in a polymer per unit volume $V_m$ of a dry polymer matrix (initially neglecting swelling of hydrophilic polymers) at an external relative humidity (RH) of 100% at a given temperature T. Water vapor solubility coefficient $S_m$ is expressed in the units of grams per cubic meters per one hundred percent relative humidity (g/(m³·100% RH)).

$$S_m(T) = \frac{m_w}{V_m \cdot 100\% \, RH} \quad (4)$$

Then the concentration $C_m$ of water dissolved in a nonswelling polymer matrix with Fickian (linear) sorption, in equilibrium with the external humidity $h_{out}(T)$, is linearly proportional to the external humidity $h_{out}$. Concentration $C_m$ is expressed in the units of grams per cubic meters (g/m³).

$$C_m(h_{out}) = S_m h_{out} \quad (5)$$

Alternatively, the amount of water dissolved in a nonswelling polymer matrix may be calculated on a weight gain basis $W_m$ in a polymer matrix having a specific gravity $\rho_m$. Weight gain basis $W_m$ is expressed in the units of grams of water per grams of polymer (g(water)/g(polymer)).

$$W_m = \frac{S_m h_{out}}{\rho_m} \quad (6)$$

Using the water vapor diffusivity $D_m(T)$ in the polymer matrix given in meters squared per second (m²/s ), the water vapor permeability $P_m(T)$ of the polymer may be calculated. Water vapor permeability $P_m(T)$ is expressed in units of gram millimeters per meters squared per second per one hundred percent relative humidity ((g·mm)/(m²·s·100% RH)).

$$P_m = D_m S_m \quad (7)$$

In equation (7) above, 100% RH refers to the relative humidity difference ΔRH on opposite sides of the permeation barrier, i.e., 100% RH at the exterior interface and 0% RH at the interior interface. This difference in relative humidity serves as a driving force for water vapor diffusion across the barrier.

The steady-state water vapor transmission rate WVTR across a unit area of the barrier with a uniform thickness L under a unit water vapor pressure difference Δp(T), corresponding to 100% relative humidity difference, is expressed in equation (8) herebelow. Water vapor transmission rate WVTR is expressed in units of grams per meters squared per second per one hundred percent relative humidity (g/(m²·s·100% RH)).

$$WVTR(T) = \frac{P_m(T)}{L} = \frac{D_m S_m}{L} \quad (8)$$

The steady-state material flux $J_0^{SS}$ of water vapor through a unit area of the barrier with a uniform thickness L and a relative humidity difference Δh across it is expressed in equation (9) herebelow. Steady-state material flux $J_0^{SS}$ is expressed in the units of grams per meters squared per second (g/(m²·s)).

$$-J_0^{SS}(T, \Delta h) = \frac{P_m(T)}{L} \Delta h = \frac{D_m S_m \Delta h}{L} \quad (9)$$

The equilibrium water vapor concentration $C_m$ in the material may potentially depend nonlinearly on the vapor pressure in the adjacent gas phase through a nonlinear sorption isotherm $C_m(p)$ or on a relative humidity h at a fixed temperature as $C_m(h)$. This sorption behavior is discussed infra.

Figure 2:
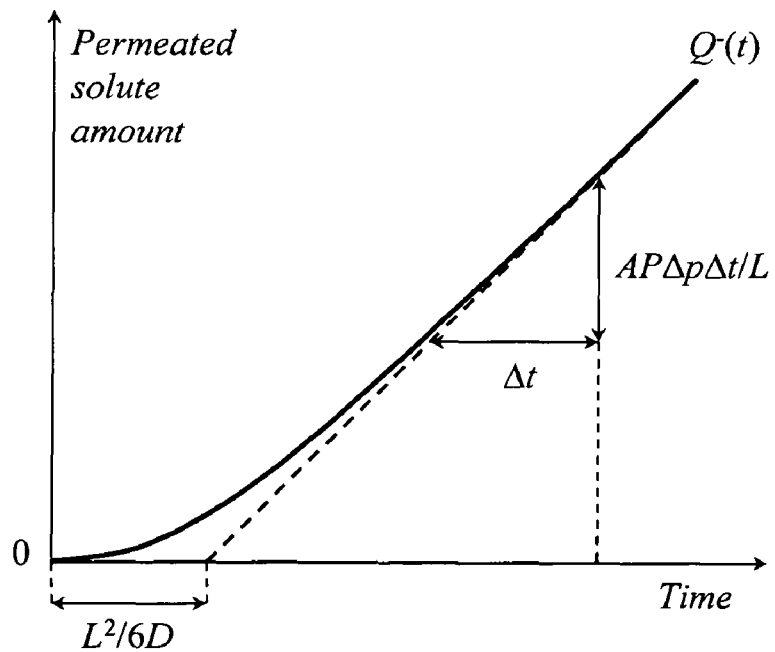
FIG. 2 is a graph of a reference time lag in a passive membrane.

The reference lag time $t_L$ refers to the asymptotic delay before the steady state solute concentration profile $C^{SS}(\xi)$ is established in an initially degassed membrane with a downstream water vapor pressure maintained at zero, i.e., $p_{in}=0$. An example of the reference time lag for a passive polymeric membrane with linear sorption is shown in FIG. 2.

For arbitrary initial condition $C_0(\xi) = C(\xi, t=0)$ for the solute concentration across the membrane thickness L with dimensionless coordinate $\xi = x/L = [0 \ldots 1]$ across the thickness and the fixed boundary conditions $C_{in} = C(0) = 0$ and $C_{out} = C(1) > 0$ within the inner surface and the outer surface boundaries, respectively, the lag time is obtained, for example by using the method of Frisch. Frisch H. L., *J. Phys. Chem.* 61, 93-95 (1957). Lag time $t_L$ calculated according to Frisch is described in equation (10) below.

$$t_L = \frac{L^2}{DC_{out}} \int_0^1 (1-\xi)[C^{SS}(\xi) - C_0(\xi)] d\xi \quad (10)$$

In equation (10), $D_m$ is the permeant diffusivity coefficient in the barrier material and the x coordinate origin is located at the inner surface of the membrane (See FIG. 1). For the initially degassed membrane with $C_0(\xi)=0$ and Fickian sorption with $S_m$=const, the steady-state vapor concentration in the membrane is calculated according to equation (11)

$$C^{SS}(\xi) = \xi C_{out} = \xi S_m h_{out}, \quad (11)$$

Integrating equation (10) in view of equation (11) yields equation (12), thereby resulting in the reference time lag $t_L$.

$$t_L = \frac{L^2}{DC_{out}} \int_0^1 (1-\xi)\xi C_{out} d\xi = \frac{L^2}{6D} \quad (12)$$

For homogeneous barrier material, it does not matter whether the solute concentration in the material is expressed in grams per cubic centimeters (g/cm³) or as gained weight in grams per gram (g/g) since these properties are linearly related to each other through the polymer matrix density $\rho_m$ according to equations (5) and (6) above, and cancel out.

After the time lag, i.e., $t_L$, the water vapor weight gain ($m_{in}$) in the contained volume V is accompanied by the vapor gain ($m_b$) in the polymer matrix of the barrier. Thus, the water vapor weight gain in the contained volume is calculated according to equation (13).

$$\frac{dm_{in}}{dt} = -J_0 A(p_{out} - p_{in}) - \frac{dm_b}{dt} \quad (13)$$

Alternatively, the water vapor weight gain may be calculated using equations (3) and (9) above. Thus, water vapor weight gain may be determined using equation (14).

$$\rho_{sat} V \frac{dh_{in}}{dt} = \frac{D_m S_m A}{L}(h_{out} - h_{in}) - \frac{1}{2} S_m A L \frac{dh_{in}}{dt} \quad (14)$$

The ½ coefficient in equation (14) appears due to the outside humidity $h_{out}$ being fixed while $h_{in}$, i.e., the humidity within the enclosure, is evolving. Rearranging equation (14) yields equation (15).

$$\left(\rho_{sat} V + \frac{1}{2} S_m A L\right) \frac{dh_{in}}{dt} = \frac{D_m S_m A}{L}(h_{out} - h_{in}) \quad (15)$$

The result of integrating equation (15) is Equation (16).

$$h_{in}(t) = h_{out} - \Delta h_0 \exp\left(-\frac{D_m S_m A}{L\left(\rho_{sat} V + \frac{1}{2} S_m A L\right)} \cdot t\right) \quad (16)$$

In view of the foregoing equations, for an initially dry contained environment with $h_{in}(0)=0$, i.e., the volume within the enclosure, the evolution of relative humidity inside the enclosure or package is approximated by equation (17).

$$h_{in}(t) = \begin{cases} 0, & \text{for } t < t_L \\ h_{out}\left[1 - \exp\left(-\frac{D_m S_m A(t - t_L)}{L\left(\rho_{sat}V + \frac{1}{2}S_m AL\right)}\right)\right], & \text{for } t \geq t_L \end{cases} \quad (17)$$

In short, during the period of time prior to reaching the lag time $t_L$ there is no humidity within the enclosure, while during the period of time after the lag time $t_L$ is reached, the humidity evolution within the enclosure is calculated according to the second equation in (17).

Next, we discuss composite barriers, i.e., barriers comprising both resin and sorbent. When a membrane contains a dispersed particulate additive that can absorb the diffusing permeant, three distinct situations are possible: (1) the additive catalytically removes the unlimited amount of permeant (by reacting with it and consuming it or by converting it into other species without depletion of the absorption capability of the additive); (2) the additive irreversibly absorbs the permeant up to a certain stoichiometric amount (usually through chemical reaction or chemisorption); or, (3) the additive reversibly immobilizes the permeant through physical adsorption. The performance of catalytically reactive and stoichiometric reactive barriers, i.e., performance through the lag time, has been analyzed elsewhere. Siegel R. A. and Cussler E. L., *J. Membr. Sci.* 229, 33-41 (2004). and Solovyov S. E., *J. Phys. Chem. B* 108, 15618-15630 (2004). The time lag in barriers containing reversible adsorptive fillers (desiccants in case of water vapor) was obtained for the commonly observed dual mode sorption isotherms of such adsorbents dispersed in a polymer matrix with Fickian (linear) sorption. Paul D. R. and Kemp D. R., *J. Polym. Sci., Symp.* 41, 79-93 (1973). The present invention allows one to predict and optimize the performance of such composite barriers after the time lag when vapor permeation increases vapor pressure in the contained downstream environment, i.e., the environment within an enclosure.

Water vapor cannot be removed catalytically at the conditions close to ambient, i.e., no known additive can irreversibly remove an unlimited amount of water vapor, therefore only irreversible stoichiometric and reversible linear and dual-mode sorption inorganic adsorbents dispersed in polymeric matrixes as fine particulates (powders) are considered herein.

Figure 3:
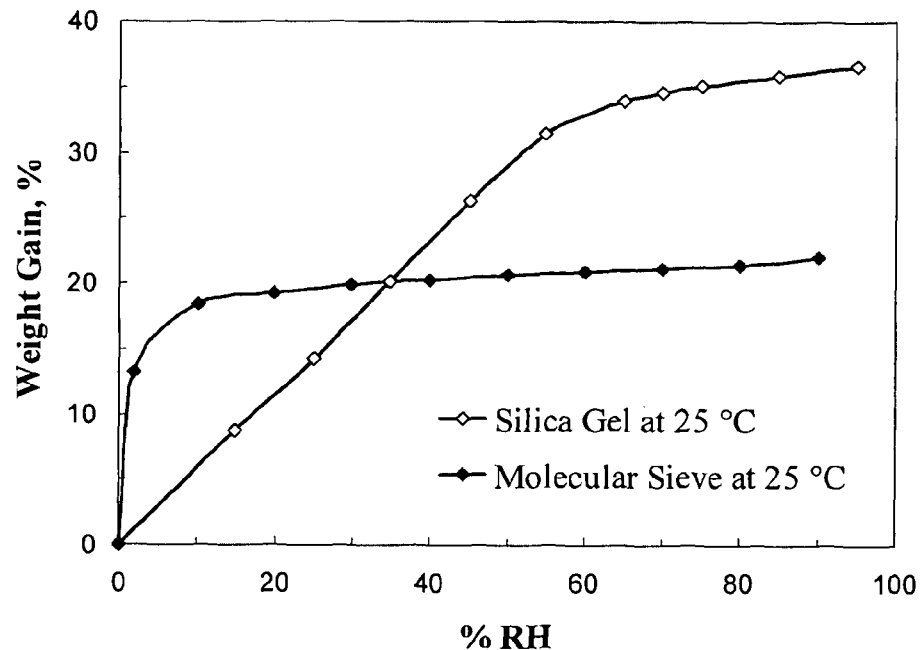
FIG. 3 is a graph of typical water vapor isotherms of molecular sieve and silica gel.
Figure 4:
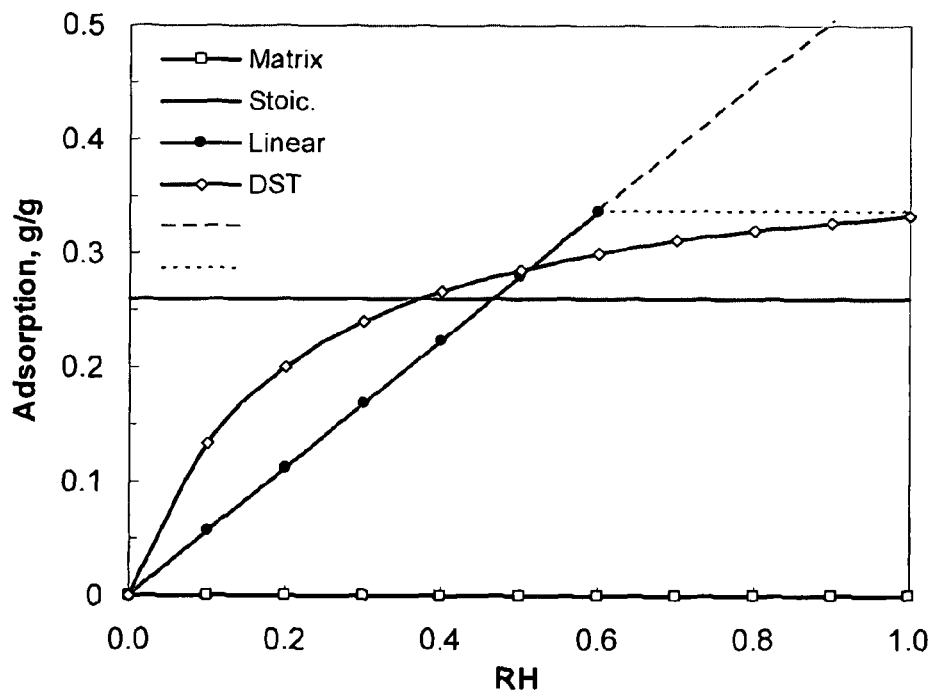
FIG. 4 is a graph of model forms of water sorption isotherms.

First, irreversible stoichiometric absorbers are considered. Commonly observed dual mode sorption behavior can give rise to two distinct sorption patterns: (1) rapid saturation at low RH values and (2) quasi-linear sorption over a wider RH range (void filling process) followed by asymptotic saturation (ordinary dissolution in the matrix). The former is represented by synthetic and naturally occurring molecular sieves (MS), and the latter by silica gel (SG) desiccants, as shown in FIG. 3. Permeation dynamics with MS type sorption isotherm is closely approximated by stoichiometric irreversible chemical reaction that removes a predetermined amount of water before being deactivated, i.e., MS saturation above approximately 20% RH. This characteristic is shown in FIG. 4 as the Stoichiometric absorber. This aspect is especially relevant when the driving force for diffusion is represented by a fixed external RH, which is much higher than the MS saturation point, and a zero percent RH downstream, i.e., a zero percent RH within the enclosure.

The reference lag time $t_{LR}$ in permeation barriers containing an irreversible chemically reactive absorber of diffusing gases and vapors with an initial mass concentration profile $R_0(\xi)$ across barrier thickness L and a stoichiometric coefficient μ in grams of water per gram of absorber (g/g) is found as a sum of the reference lag time $t_L$ of the matrix polymer barrier and the steady-state lag time $t_R$ due to the stoichiometric reaction of the solute with the dispersed additive. Siegel R. A. and Cussler E. L., *J. Membr. Sci.* 229, 33-41 (2004). The reference lag time $t_{LR}$ is described by equation (18).

$$\begin{aligned} t_{LR} &= t_L + t_R \\ &= \frac{L^2}{6D} + \frac{L^2}{D}\frac{\mu}{C_{out}}\int_0^1 (1-\xi)R_0(\xi)d\xi \end{aligned} \quad (18)$$

For uniform reactive additive loading across the barrier thickness $R_0(\xi)$=const, the lag time expression is simplified to equation (19).

$$\begin{aligned} t_{LR} &= t_L + t_R \\ &= \frac{L^2}{6D} + \frac{L^2}{2D}\frac{\mu R_0}{C_{out}} \\ &= \frac{L^2}{6D}(1 + 3\Psi) \end{aligned} \quad (19)$$

The dimensionless complex $\Psi$ is called the relative reactive capacity of the barrier material and is described by equation (20).

$$\Psi = \frac{\mu R_0}{C_{out}} \quad (20)$$

For polymers with Fickian sorption, the water concentration within the upstream membrane boundary, i.e., the exterior surface of the enclosure, can be expressed through the constant solubility coefficient $S_m$ as in equation (5).

For the adsorbent desiccant with the volume fraction $\phi_d$ and the apparent particle density $\rho_d$ dispersed in a polymer matrix with the volume fraction $\phi_m$ and the density $\rho_m$, wherein $\phi_d + \phi_m = 1$, the desiccant mass concentration in the uniformly filled composite material having a volume $V_C$ is described by equation (21).

$$R_0 = \frac{m_d}{V_d + V_m} = \frac{\rho_d V_d}{V_C} = \phi_d \rho_d \quad (21)$$

A modified form of equation (11) accounts for the fact that the water vapor solubility in both the matrix and the dispersed irreversible absorber contributes to the steady state water mass concentration in the composite material. Equation (22) is the modified form of equation (11).

$$C_C^{SS}(\xi) = \phi_m S_m h_{out}\xi + \phi_d W_d \rho_d \quad (22)$$

$W_d$ is the saturation capacity of MS type stoichiometric desiccant, i.e., the weight of adsorbed water per unit weight of desiccant, and $\rho_d$ is the apparent density of a desiccant particle, i.e., the desiccant particle mass divided by the volume excluded by the particle in a polymer matrix. However, the water immobilized in the adsorber does not contribute to the steady-state flux. For the reference conditions, the time lag is calculated according to equation (23).

$$t_{LR} = \frac{L^2}{D_m \phi_m S_m h_{out}} \int_0^1 (1-\xi)(C_C^{SS}(\xi) - 0) d\xi = \quad (23)$$

$$= \frac{L^2}{D_m \phi_m S_m h_{out}} \int_0^1 (1-\xi)[\phi_m S_m h_{out}\xi + W_d \phi_d \rho_d] d\xi =$$

$$= \frac{L^2}{6D_m} + \frac{L^2}{2D_m} \frac{\phi_d}{\phi_m} \frac{W_d \rho_d}{S_m h_{out}} = \frac{L^2}{6D_m}(1 + 3\Psi)$$

Equation (23) is a mass fraction equivalent of the result of equation (20); however in this instance, $\Psi$ is described by equation (24).

$$\Psi = \frac{\mu R_0}{S_m p_{out}} = \frac{\phi_d}{\phi_m} \frac{W_d \rho_d}{S_m h_{out}} \quad (24)$$

If $\phi_d$ is the volume fraction of adsorbent, i.e., desiccant, loaded into the polymeric matrix, and $f_d$ is the adsorbent's weight fraction, then these fractions can be interconverted according to equations (25) and (26).

$$\phi_d = \frac{f_d}{f_d + \frac{\rho_d}{\rho_m}(1 - f_d)} \quad (25)$$

$$f_d = \frac{\phi_d}{\phi_d + \frac{\rho_m}{\rho_d}(1 - \phi_d)} \quad (26)$$

If a perfect sink exists at the membrane downstream after the lag time, then the rate of solute ingress is proportional to the permeance $TR^{SS}$ of the inactivated composite material with the effective diffusivity $D_C$ and solubility coefficient $S_C$. The effective flux $J_0$ represents the rate of solute permeation across downstream membrane boundary. It should be appreciated that a "perfect sink" is intended to mean that the membrane downstream, or in other words the volume within the enclosure, is maintained at zero percent (0%) RH, including during periods of moisture ingress through the barrier material.

$$-J_0(t) = TR^{SS}(p_{out} - p_{in}(t)) = \frac{D_C S_C}{L}(p_{out} - p_{in}(t)) \quad (27)$$

Equation (27) presupposes that the internal pressure $p_{in}$ changes slowly and the pseudo steady state flux is established across the barrier. This is usually the case for packaging enclosures encapsulating a total volume much larger than the volume of used packaging material, which constitutes a standard design goal for any package. When the adsorber is impermeable to water vapor, i.e., it does not act as a water diffusion pathway, and the adsorber does not significantly affect water molecule mobility in the matrix, then equation (27) is modified becoming equation (28).

$$-J_0(t) = \frac{\phi_m D_m S_m}{L}(h_{out} - h_{in}(t)) \quad (28)$$

Using equations (23) and (28), and accounting for the reduced volume fraction of the polymer matrix available for diffusion, due to the presence of the adsorbent particles, the evolution of humidity inside the package, i.e., enclosure, is expressed by equation (29).

$$h_{in}(t) = \begin{cases} 0, & \text{for } t < t_{LR} \\ h_{out}\left[1 - \exp\left(-\frac{\phi_m D_m S_m A(t - t_{LR})}{L\left(\rho_{sat}V + \frac{1}{2}\phi_m S_m AL\right)}\right)\right], & \text{for } t \geq t_{LR} \end{cases} \quad (29)$$

In short, during the period of time prior to reaching the lag time $t_{LR}$ there is no humidity within the enclosure, while during the period of time after the lag time $t_{LR}$ is reached, the humidity within the enclosure is calculated according to the second equation in (29).

For RH levels below desiccant saturation humidity $h_{sat}$, the sorption isotherm of the desiccant is often linear: $C_d(h \leq h_{sat}) = S_d h$, and above saturation vapor pressure $p_{sat}$ the internal surfaces of the desiccant are close to being saturated and Fickian dissolution is often negligible: $C_d(h > h_{sat}) \approx S_d h_{sat} = $const. These sorption modes are analyzed and discussed infra.

Below the saturation vapor pressure of the desiccant, the effective solubility coefficient of the composite material can be defined on a volumetric concentration basis, and is calculated according to equations (30) and (31).

$$C_C = S_{eff} h \quad (30)$$

$$S_{eff} = \phi_m S_m + \phi_d S_d = \phi_m S_m + \phi_d W_d \rho_d \quad (31)$$

The reference lag time $t_{LL}$ in a composite barrier having a linear mode adsorber dispersed therein is calculated according equation (32).

$$t_{LL} = \frac{L^2}{DC_{out}} \int_0^1 (1-\xi)[C^{SS}(\xi) - C_0(\xi)] d\xi = \quad (32)$$

$$= \frac{L^2}{D_m \phi_m S_m h_{out}} \int_0^1 (1-\xi)\xi \cdot S_{eff} h_{out} d\xi$$

$$= \frac{L^2}{D_m} \frac{\phi_m S_m + \phi_d S_d}{\phi_m S_m} \int_0^1 (\xi - \xi^2) d\xi =$$

$$= \frac{L^2}{D_m}\left(1 + \frac{\phi_d S_d}{\phi_m S_m}\right)\left(\frac{\xi^2}{2} - \frac{\xi^3}{3}\right)\Big|_0^1$$

$$= \frac{L^2}{6D_m}\left(1 + \frac{\phi_d S_d}{\phi_m S_m}\right) = \frac{L^2}{6D_m}\left(1 + \frac{\phi_d W_d \rho_d}{\phi_m S_m}\right)$$

$$= \frac{L^2}{6D_m}(1 + \Psi h_{out})$$

It should be noted that $t_{LL}$, i.e., equation (32), is approximately three times less than $t_{LR}$, i.e., equation (23) when the relative adsorption capacity of the barrier $\Psi \gg 1$ and the external humidity $h_{out}$ is close to 100%.

After the lag time $t_{LL}$ the water vapor accumulation in the internal headspace volume V, i.e., the empty volume within the enclosure, is described by a mass balance analogous to equation (14), equation (33) herebelow.

$$\rho_{sat}V\frac{dh_{in}}{dt} = \frac{\phi_m D_m S_m A}{L}(h_{out} - h_{in}) - \frac{1}{2}S_{eff}AL\frac{dh_{in}}{dt} \quad (33)$$

Equation (33) can be rearranged as shown in equation (34) below.

$$\left(\rho_{sat}V + \frac{1}{2}S_{eff}AL\right)\frac{dh_{in}}{dt} = \frac{\phi_m D_m S_m A}{L}(h_{out} - h_{in}) \quad (34)$$

Solving equation (34) for $h_{in}$ results in equation (35), where $\Delta h_0 = h_{out} - h_{in,0}$ is the initial relative humidity difference across the barrier.

$$h_{in}(t) = h_{out} - \Delta h_0 \exp\left(-\frac{\phi_m D_m S_m A}{L\left(\rho_{sat}V + \frac{1}{2}S_{eff}AL\right)} \cdot t\right) \quad (35)$$

In view of the foregoing, the combined approximate solution for the internal pressure growth for the reference initial conditions results in equation (36) having the $t_{LL}$ value provided by equation (32) and the $S_{eff}$ value provided by equation (31).

$$h_{in}(t) = \begin{cases} 0, & \text{if } t \leq t_{LL} \\ h_{out}\left[1 - \exp\left(-\frac{\phi_m D_m S_m A(t - t_{LL})}{L\left(\rho_{sat}V + \frac{1}{2}S_{eff}AL\right)}\right)\right], & \text{if } t > t_{LL} \end{cases} \quad (36)$$

In short, during the period of time prior to reaching the lag time $t_{LL}$ there is no humidity within the enclosure, while during the period of time after the lag time $t_{LL}$ is reached, the humidity within the enclosure is calculated according to the second equation in (36).

As described supra, many sorbents may also behave as reversible dual mode adsorbers with Fickian (bulk dissolution) and Langmuir (hole saturation) mode sorption behavior. Dual mode sorption (DS) isotherms $S_d(h)$ of common desiccants can be incorporated into the effective solubility coefficient of the desiccant-loaded polymer composite with $C_C = S_{eff}(T)h$, according to equations (37), (38) and (39).

$$S_d = S_d(h) = \frac{C_{max}b}{1+bh} \quad (37)$$

$$S_{eff}(h) = \phi_m S_m + \phi_d S_d(h) \quad (38)$$

$$C_C(h) = S_{eff}(h)h = \phi_m S_m h + \phi_d \frac{C_{max}b}{1+bh}h \quad (39)$$

The parameter $C_{max}$ is the so-called hole saturation constant in the Langmuir mode sorption. The phenomenological Langmuir affinity constant b is correlated to the ratio of solute sorption and desorption rate constants in the Langmuir mode. The effective sorption isotherm combines the Fickian mode sorption of the polymer matrix and the dual mode sorption of the desiccant.

The reference lag time $t_{LD}$ with dual mode sorption isotherm of the desiccant is found as in equation (10). Paul D. R. and Kemp D. R., *J. Polym. Sci., Symp.* 41, 79-93 (1973).

$$t_{LD} = \frac{L^2}{DC_{out}}\int_0^1 (1-\xi)[C^{SS}(\xi) - C_0(\xi)]d\xi = \quad (40)$$

$$= \frac{L^2}{D_m \phi_m S_m h_{out}}\int_0^1 (1-\xi)$$

$$\left(\phi_m S_m h_{out}\xi + \phi_d \frac{C_{max}bh_{out}\xi}{1+bh_{out}\xi}\right)d\xi =$$

$$= \frac{L^2}{6D_m}\left(1 + \frac{\phi_d}{\phi_m}\frac{C_{max}b}{S_m}\frac{6}{y^3}\left[\frac{1}{2}y^2 + y - (1+y)\ln(1+y)\right]\right)$$

Unlike $\Psi$ above, y is set forth in equation (41) below.

$$y = bh_{out} \quad (41)$$

Contrary to equation (33), the change in the effective solubility coefficient $S_{eff}(h_{in})$ in the barrier during a change in internal humidity $h_{in}$ cannot be disregarded due to nonlinearity of sorption isotherm and such change has to be differentiated to obtain permeation dynamics. In this instance, the mass balance inside the fixed container volume V is expressed by equation (42), (43) or, equivalently, (44).

$$\rho_{sat}V\frac{dh_{in}}{dt} = \frac{\phi_m D_m S_m A}{L}(h_{out} - h_{in}) - \frac{1}{2}AL\frac{d(S_{eff}(h_{in})h_{in})}{dt} \quad (42)$$

$$\frac{\rho_{sat}V + \frac{AL}{2}\left(\phi_m S_m + \phi_d\frac{C_{max}b}{(1+bh_{in})^2}\right)}{h_{out} - h_{in}}\frac{dh_{in}}{dt} = \frac{\phi_m D_m S_m A}{L} \quad (43)$$

$$\frac{a_4 + a_3\left(a_2 + \frac{a_1}{(1+bh_{in})^2}\right)}{h_{out} - h_{in}}\frac{dh_{in}}{dt} = a_5 \quad (44)$$

The coefficients of equation (44) are included below in equation (45).

$$a_1 = \phi_d C_{max} b;$$
$$a_2 = \phi_m S_m;$$
$$a_3 = \frac{AL}{2}; \quad (45)$$
$$a_4 = \rho_{sat}V;$$
$$a_5 = \frac{\phi_m D_m S_m A}{L}.$$

Solving equation (45) results in equation (46) and subsequently equation (47) for the integration constant, obtained from known initial condition $h_{in,0}$ for relative humidity inside the package.

$$\frac{a_1 a_3 \ln(1+bh_{in}) - (a_1 a_3 + (a_2 a_3 + a_4)(1+bh_{out})^2)\ln(h_{out} - h_{in}) - \frac{a_1 a_3 \ln(1+bh_{out})/(1+bh_{in})}{a_5(1+bh_{out})^2}}{} = t + const \quad (46)$$

$$const = \frac{a_1 a_3 \ln(1+bh_{in,0}) - (a_1 a_3 + (a_2 a_3 + a_4)(1+bh_{out})^2)\ln(h_{out} - h_{in,0}) - \frac{a_1 a_3 \ln(1+bh_{out})/(1+bh_{in,0})}{a_5(1+bh_{out})^2}}{} \quad (47)$$

Although the RH within the enclosure remains equal to zero percent (0%) prior to reaching $t_{LD}$ as calculated by equation (40), the RH evolution $h_{in}(t)$ inside the package after $t_{LD}$ is an implicit function expressed as $t(h_{in})$, i.e., equation (48).

$$t = t_{LD} + \frac{a_1 a_3}{a_5(1+bh_{out})^2}\left[\ln\frac{1+bh_{in}}{1+bh_{in,0}} - \ln\frac{h_{out}-h_{in}}{h_{out}-h_{in,0}} - \ln(1+bh_{out})\right. \tag{48}$$
$$\left.\left(\frac{1}{1+bh_{in}} - \frac{1}{1+bh_{in,0}}\right)\right] - \frac{a_2 a_3 + a_4}{a_5}\ln\frac{h_{out}-h_{in}}{h_{out}-h_{in,0}}$$

Thus, unlike the equations above, to calculate the value of humidity within the enclosure $h_{in}$ based on time t, a plurality of values of $h_{in}$ are used to determine a plurality of times t. Subsequently, the relationship between $h_{in}$ and t can be graphically represented or analyzed using other methods.

Figure 5A:
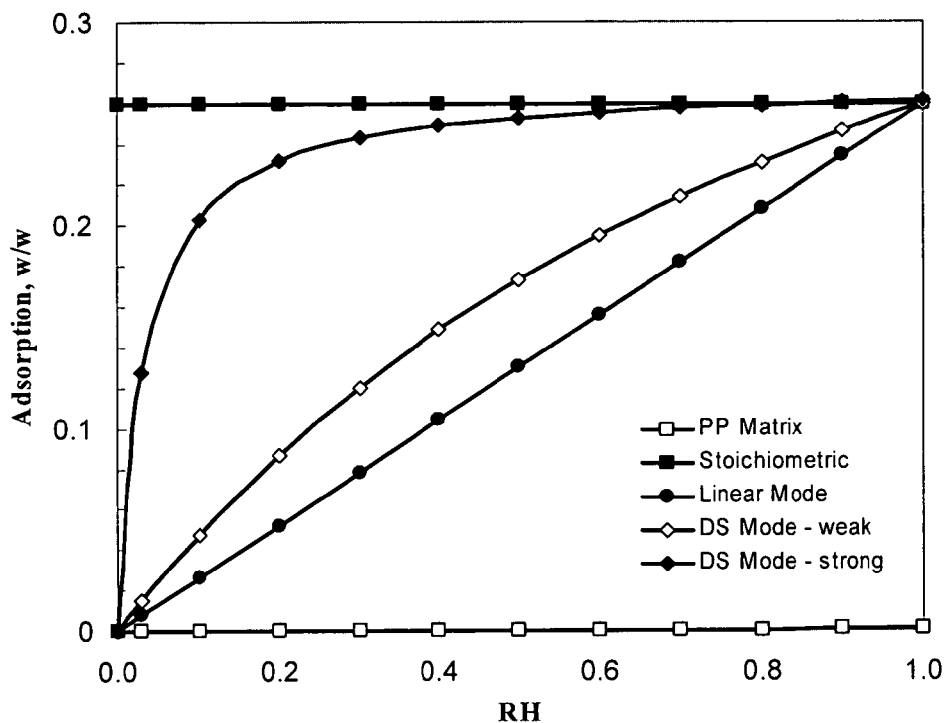
FIG. 5A is a graph of water sorption isotherms for polypropylene and various sorbent materials.
Figure 6A:
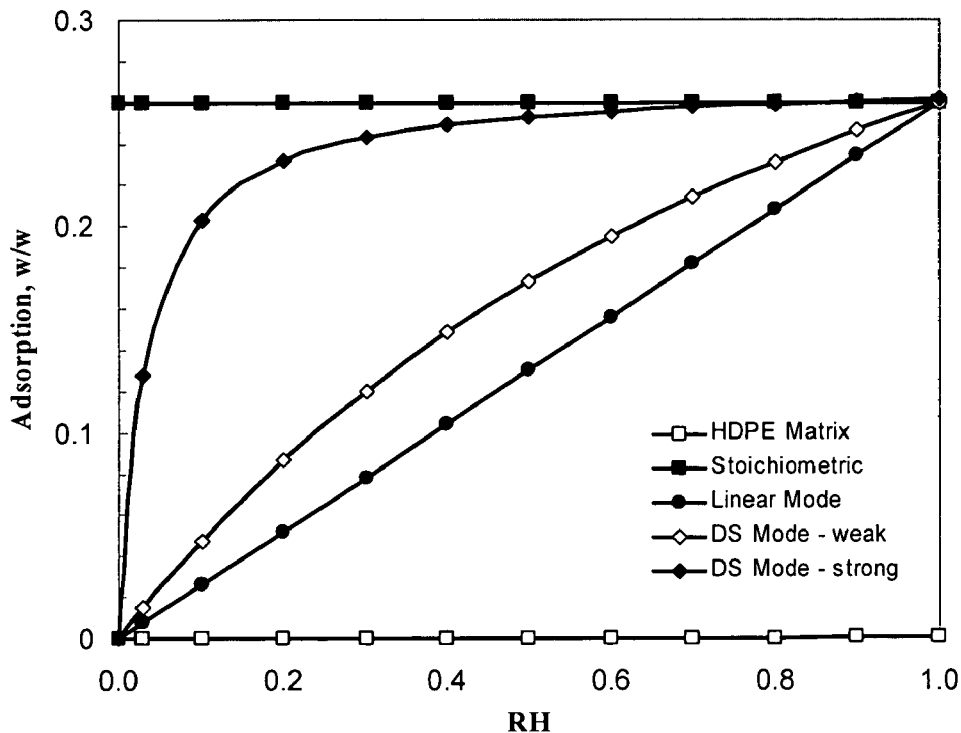
FIG. 6A is a graph of water sorption isotherms for high density polyethylene and various sorbent materials.

In view of the foregoing analysis, the following examples of resin and sorbent composites show how the present invention is used to optimize formulations of adsorptive composite barriers via the selection of such materials and the ratios therebetween. In the first example, the resin used is polypropylene (PP) (See FIGS. 5A and 5B), while in the second example, high density polyethylene (HDPE) is the resin (See FIGS. 6A and 6B). In the third example, the resin used is polyethylene terephthalate (PET) (See FIGS. 7A and 7B), and the fourth example uses a hygroscopic polyamide resin nylon 6,6 (See FIGS. 8A and 8B). Each example compares the performance of each respective resin in combination with stoichiometric, linear and dual mode adsorbers, where the dual mode adsorbers are modeled as having either a weakly nonlinear sorption isotherm, i.e., close to a linear adsorber, or a strongly nonlinear sorption isotherm, i.e., close to a stoichiometric adsorber.

In the examples presented infra, the stoichiometric or irreversible chemical adsorber considered is calcium oxide (CaO), while the linear mode adsorber considered is silica gel at zero to sixty percent (0-60%) relative humidity, the strong dual sorption mode adsorber considered is molecular sieve, and the weak dual sorption mode adsorber considered is a mixture of molecular sieve and silica gel. It should be appreciated that other sorbents which are well known in the art may also be considered when performing the present invention method, and such sorbents are within the spirit and scope of the claimed invention. Additionally, although only polypropylene, high density polyethylene, polyethylene terephthalate and nylon are discussed herebelow, it should be appreciated that the present invention method may be used when considering any appropriate resin/polymer, and such resin/polymers are within the spirit and scope of the claimed invention.

Furthermore, all sorption isotherms have been adjusted to correspond to the same twenty-six weight percent (26 wt. %) ultimate moisture sorption capacity at one hundred percent (100%) relative humidity to facilitate comparison between cases. Actual isotherms differ in ultimate capacity as shown in FIG. 3. Additionally, it should be noted that although each composition described herebelow comprises forty weight percent (40 wt. %) sorbent, the volumetric loading values are each different due to differences in resin density.

EXAMPLE 1

Polypropylene and Various Sorbents

TABLE 1 characteristics of polypropylene and sorbents used in calculations

| Variable | Value | Units |
|---|---|---|
| External relative humidity ($h_{out}$) | 80% | |
| Initial internal relative humidity ($h_{in,0}$) | 0% | |
| Barrier Surface Area (A) | $6.00 \times 10^{-4}$ | $m^2$ |
| Barrier Thickness (L) | $1.00 \times 10^{-3}$ | m |
| Diffusivity (D or $D_m$) | $1.00 \times 10^{-12}$ | $m^2/s$ |
| Permeability (P) | $5.00 \times 10^{-10}$ | g m/($m^2$s 100% RH) |
| Desiccant weight loading fraction ($\phi_d$) | 0.4 | |
| Desiccant density ($\rho_d$) | 2.0 | g/cc |
| Matrix or Resin density ($\rho_m$) | 0.90 | g/cc |
| Desiccant saturation capacity ($W_d$) | 0.26 | g/g/100% RH |
| Hole saturation constant weak DS mode ($C_{max}$) | 0.52 | g/g/100% RH |
| Hole saturation constant strong DS mode ($C_{max}$) | 0.27 | g/g/100% RH |
| Langmuir affinity constant weak DS mode (b) | 1 | |
| Langmuir affinity constant strong DS mode (b) | 30 | |
| Internal headspace volume (V) | $1.00 \times 10^{-6}$ | $m^3$ |
| Saturated vapor density at 20° C. ($\rho_{sat}$) | 17.3 | $g/m^3$/100% RH |
| Saturated vapor pressure at 20° C. ($p_{sat}$) | 2308 | Pa |

Figure 5B:
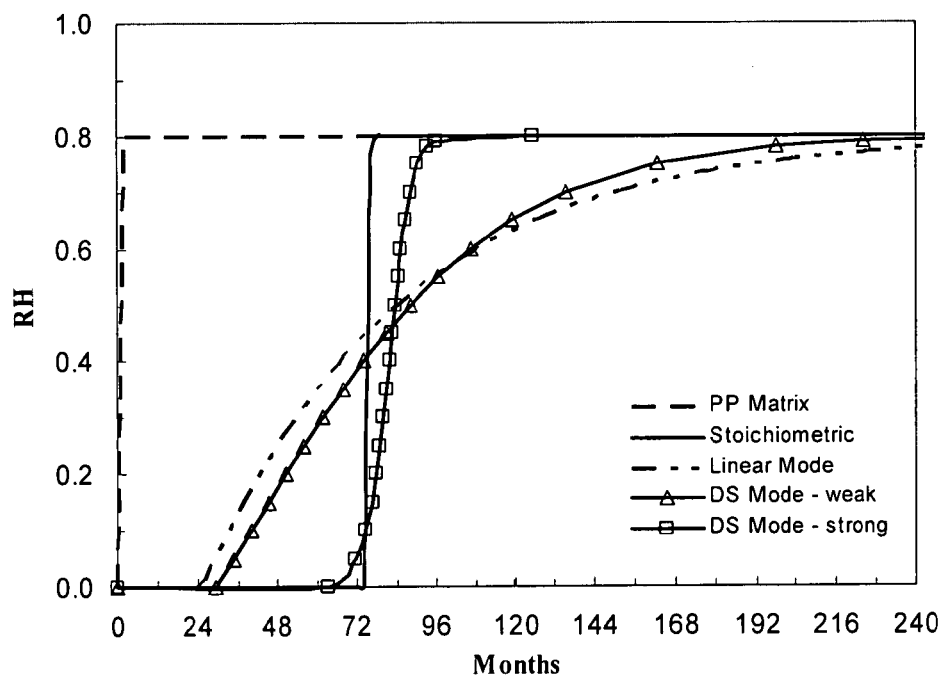
FIG. 5B is a graph of permeation dynamics through a composite barrier comprising polypropylene resin and various sorbent materials.

As can be seen in FIG. 5B, lag times vary from about twenty-four (24) months to about seventy-two (72) months, and internal relative humidity levels rise according to the resin/sorbent composition. Thus if an internal relative humidity of sixty percent (60%) were considered the failure point, failure times would range from about seventy-six (76) months to about one hundred eight (108) months.

EXAMPLE 2

High Density Polyethylene and Various Sorbents

TABLE 2 characteristics of high density polyethylene and sorbents used in calculations

| Variable | Value | Units |
|---|---|---|
| External relative humidity ($h_{out}$) | 80% | |
| Initial internal relative humidity ($h_{in0}$) | 0% | |
| Barrier Surface Area (A) | $6.00 \times 10^{-4}$ | $m^2$ |
| Barrier Thickness (L) | $1.00 \times 10^{-3}$ | m |
| Diffusivity (D or $D_m$) | $5.50 \times 10^{-13}$ | $m^2/s$ |
| Permeability (P) | $2.80 \times 10^{-10}$ | g m/($m^2$s 100% RH) |
| Desiccant weight loading fraction ($\phi_d$) | 0.4 | |
| Desiccant density ($\rho_d$) | 2.0 | g/cc |
| Matrix or Resin density ($\rho_m$) | 0.96 | g/cc |
| Desiccant saturation capacity ($W_d$) | 0.26 | g/g/100% RH |
| Hole saturation constant weak DS mode ($C_{max}$) | 0.52 | g/g/100% RH |
| Hole saturation constant strong DS mode ($C_{max}$) | 0.27 | g/g/100% RH |
| Langmuir affinity constant weak DS mode (b) | 1 | |
| Langmuir affinity constant strong DS mode (b) | 30 | |
| Internal headspace volume (V) | $1.00 \times 10^{-6}$ | $m^3$ |
| Saturated vapor density at 20° C. ($\rho_{sat}$) | 17.3 | g/$m^3$/100% RH |
| Saturated vapor pressure at 20° C. ($p_{sat}$) | 2308 | Pa |

Figure 6B:
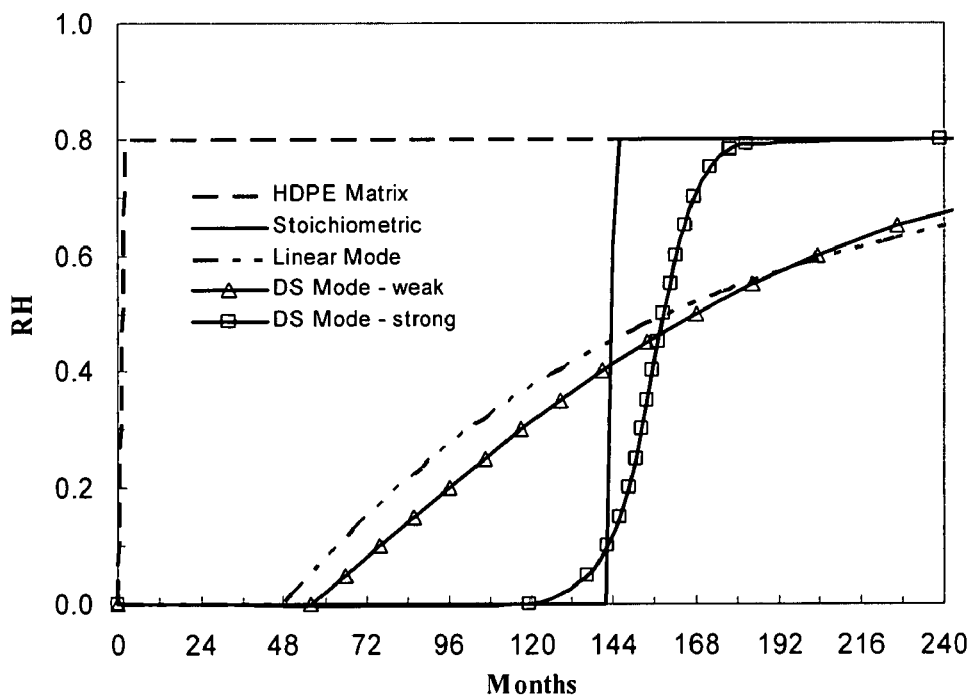
FIG. 6B is a graph of permeation dynamics through a composite barrier comprising high density polyethylene resin and various sorbent materials.
Figure 7A:
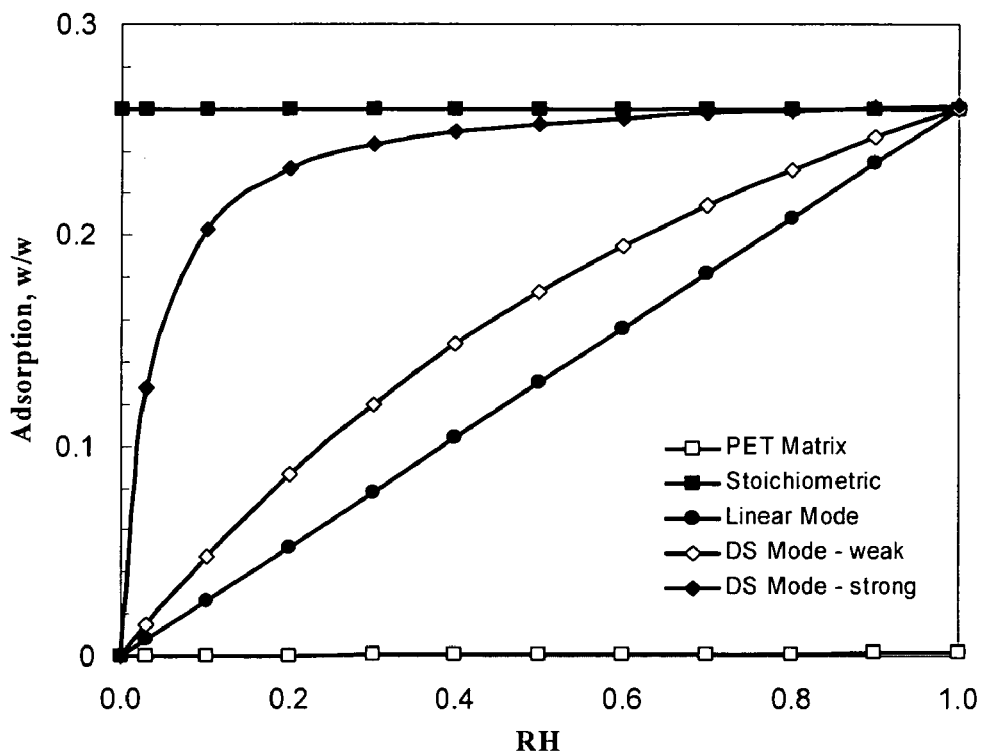
FIG. 7A is a graph of water sorption isotherms for polyethylene terephthalate and various sorbent materials.

As can be seen in FIG. 6B, lag times vary from about forty-eight (48) months to about one hundred forty-four (144) months, and internal relative humidity levels rise according to the resin/sorbent composition. Thus if an internal relative humidity of sixty percent (60%) were considered the failure point, failure times would range from about one hundred forty-four (144) months to about two hundred seven (207) months.

EXAMPLE 3

Polyethylene Terephthalate and Various Sorbents

TABLE 3 characteristics of polyethylene terephthalate and sorbents used in calculations

| Variable | Value | Units |
|---|---|---|
| External relative humidity ($h_{out}$) | 80% | |
| Initial internal relative humidity ($h_{in0}$) | 0% | |
| Barrier Surface Area (A) | $6.00 \times 10^{-4}$ | $m^2$ |
| Barrier Thickness (L) | $1.00 \times 10^{-3}$ | m |
| Diffusivity (D or $D_m$) | $2.00 \times 10^{-12}$ | $m^2/s$ |
| Permeability (P) | $3.00 \times 10^{-9}$ | g m/($m^2$s 100% RH) |
| Desiccant weight loading fraction ($\phi_d$) | 0.4 | |
| Desiccant density ($\rho_d$) | 2.0 | g/cc |
| Matrix or Resin density ($\rho_m$) | 1.3 | g/cc |
| Desiccant saturation capacity ($W_d$) | 0.26 | g/g/100% RH |
| Hole saturation constant weak DS mode ($C_{max}$) | 0.52 | g/g/100% RH |
| Hole saturation constant strong DS mode ($C_{max}$) | 0.27 | g/g/100% RH |
| Langmuir affinity constant weak DS mode (b) | 1 | |
| Langmuir affinity constant strong DS mode (b) | 30 | |
| Internal headspace volume (V) | $1.00 \times 10^{-6}$ | $m^3$ |
| Saturated vapor density at 20° C. ($\rho_{sat}$) | 17.3 | g/$m^3$/100% RH |
| Saturated vapor pressure at 20° C. ($p_{sat}$) | 2308 | Pa |

Figure 7B:
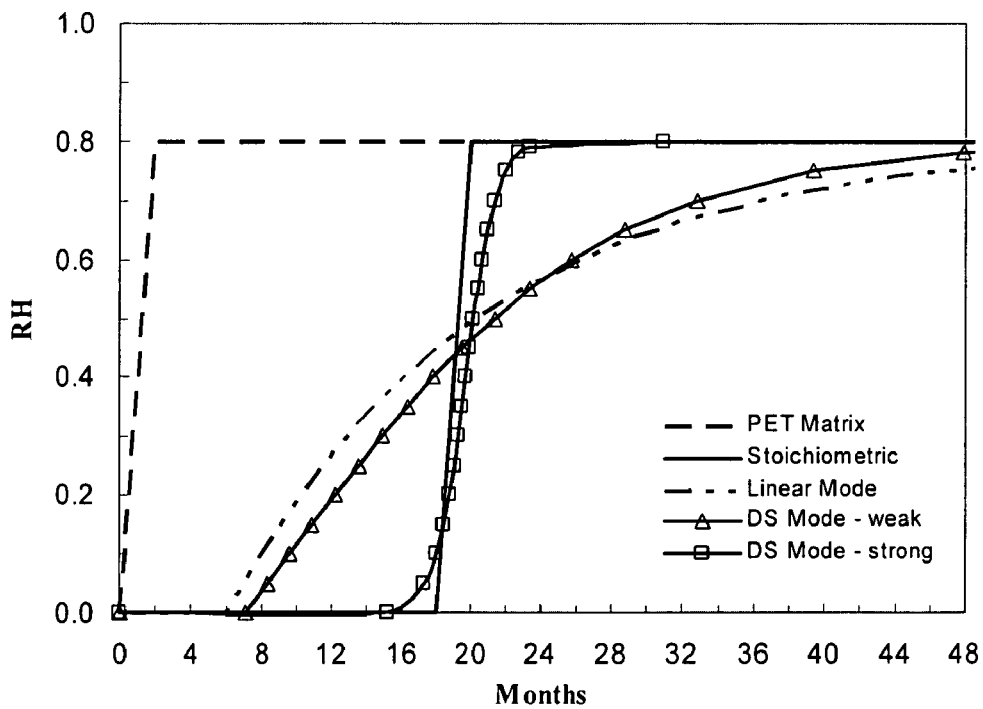
FIG. 7B is a graph of permeation dynamics through a composite barrier comprising polyethylene terephthalate resin and various sorbent materials.
Figure 8A:
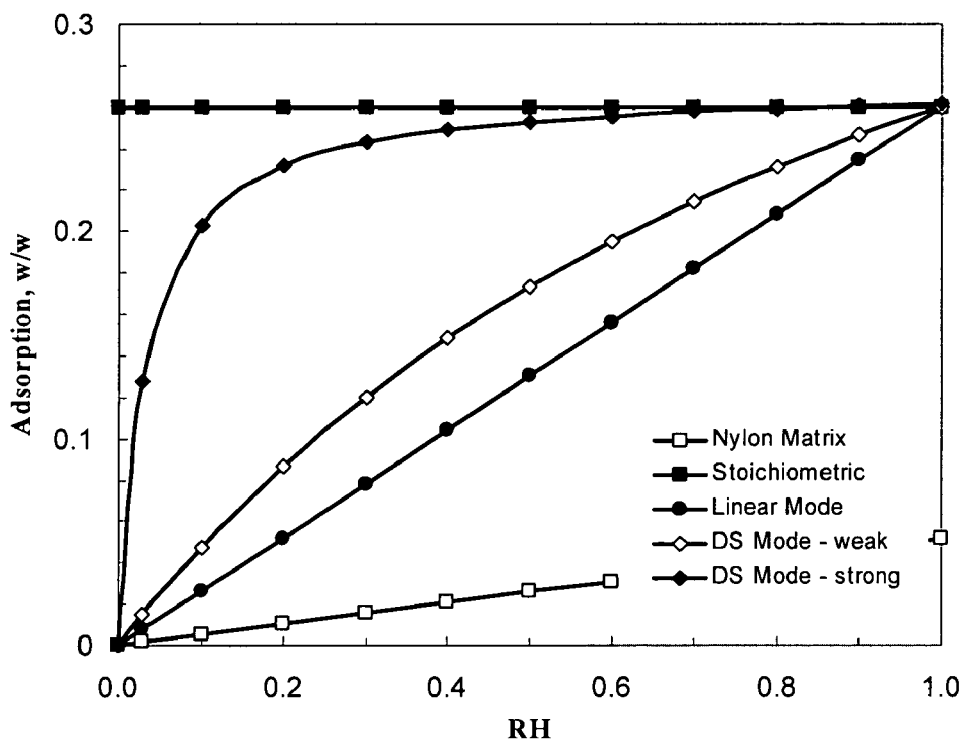
FIG. 8A is a graph of water sorption isotherms for nylon and various sorbent materials.

As can be seen in FIG. 7B, lag times vary from about six (6) months to about eighteen (18) months, and internal relative humidity levels rise according to the resin/sorbent composition. Thus if an internal relative humidity of sixty percent (60%) were considered the failure point, failure times would range from about nineteen and a half (19½) months to about twenty-six (26) months.

EXAMPLE 4

Nylon and Various Sorbents

TABLE 4 characteristics of nylon and sorbents used in calculations

| Variable | Value | Units |
|---|---|---|
| External relative humidity ($h_{out}$) | 80% | |
| Initial internal relative humidity ($h_{in0}$) | 0% | |
| Barrier Surface Area (A) | $6.00 \times 10^{-4}$ | $m^2$ |
| Barrier Thickness (L) | $1.00 \times 10^{-3}$ | m |
| Diffusivity (D or $D_m$) | $2.40 \times 10^{-13}$ | $m^2/s$ |
| Permeability (P) | $1.24 \times 10^{-8}$ | $g/m/(m^2 s\ 100\%\ RH)$ |
| Desiccant weight loading fraction ($\phi_d$) | 0.4 | |
| Desiccant density ($\rho_d$) | 2.0 | g/cc |
| Matrix or Resin density ($\rho_m$) | 1.14 | g/cc |
| Desiccant saturation capacity ($W_d$) | 0.26 | g/g/100% RH |
| Hole saturation constant weak DS mode ($C_{max}$) | 0.52 | g/g/100% RH |
| Hole saturation constant strong DS mode ($C_{max}$) | 0.27 | g/g/100% RH |
| Langmuir affinity constant weak DS mode (b) | 1 | |
| Langmuir affinity constant strong DS mode (b) | 30 | |
| Internal headspace volume (V) | $1.00 \times 10^{-6}$ | $m^3$ |
| Saturated vapor density at 20° C. ($\rho_{sat}$) | 17.3 | $g/m^3/100\%\ RH$ |
| Saturated vapor pressure at 20° C. ($p_{sat}$) | 2308 | Pa |

Figure 8B:
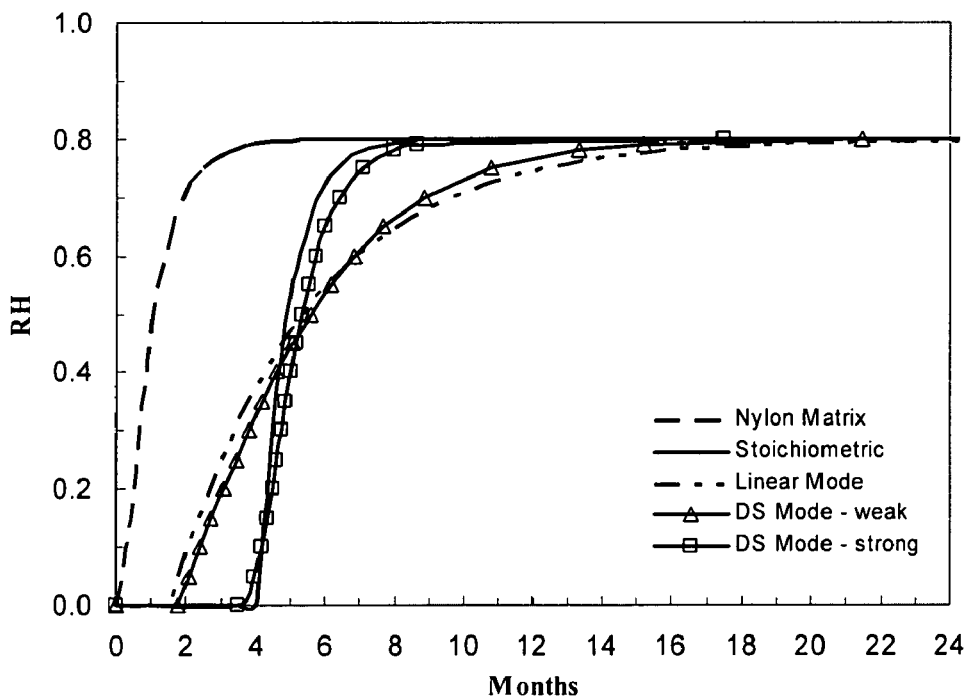
FIG. 8B is a graph of permeation dynamics through a composite barrier comprising nylon resin and various sorbent materials; and, FIG. 9 is a cross sectional view of a typical resin-sorbent composite formed according to the present invention method.

As can be seen in FIG. 8B, lag times vary from about two (2) months to about four (4) months, and internal relative humidity levels rise according to the resin/sorbent composition. Thus if an internal relative humidity of sixty percent (60%) were considered the failure point, failure times would range from about five and a half (5½) months to about seven (7) months.

The presented results demonstrate that linear and weakly nonlinear adsorbers, while providing a shorter lag time, could potentially result in a longer service time of packaged components. For example, such linear adsorbers can provide a much longer time to reach 60% RH inside the container than stoichiometric and strongly nonlinear (dual mode) adsorbers with the same saturation capacity and weight fraction loading in a composite barrier, as shown in FIGS. 5A through 8B. In view of the foregoing, one of ordinary skill in the art may determine which resin from a group of resins, which sorbent from a group of sorbents, and which ratio therebetween will provide the required characteristic, e.g., rigidity, hardness, weight, material compatibilities, etc., while maintaining a relative humidity at or below an acceptable level within an enclosure constructed from the resin/sorbent composite for the desired length of time. Thus, part costs can be minimized and part performance can be maximized.

In view of the foregoing, it is believed that the present invention method shows that preferred resins for such active barriers include high moisture barrier passive polymeric matrices, e.g., polyolefins such as polypropylene and polyethylene, or in other words, polymers with inherently low water vapor permeability. It has been found that desiccating materials such as physical adsorbers, e.g., silica gels and molecular sieves, and chemical adsorbers, e.g., calcium oxide, should be prepared as fine powders with particle sizes from approximately one micron (1 μm) to approximately fifty microns (50 μm) prior to dispersion in a polymer matrix during compounding. Smaller mean sizes of sorbent particles have been shown to reduce the probability of water molecules bypassing these particles during moisture diffusion across a composite barrier at the same sorbent loading. See Solovyov S. E., *J. Phys. Chem. B* 110, 17977-17986 (2006). The resulting effect is the reduction of transient permeation rates through such composites to zero or nearly zero.

The foregoing results were obtained based on the assumption that the particulate desiccant is well dispersed in the polymer matrix without agglomeration and that it does not provide facilitated pathways for moisture diffusion within the polymer matrix, such as channels, voids, pores, and interconnected entrained particle assemblies. It has been found that the dispersion of desiccant particles has to be performed during the melt compounding stage to prevent particle agglomeration in the composite, provide sufficient separation between nearby particles and create a contiguous matrix polymer phase in a composite. The single and twin-screw extrusion techniques have been found to be most suitable for melt compounding. It has also been found that in a preferred embodiment the volumetric loading of desiccant in the composite should be limited to levels below twenty-five to thirty percent by volume (25-30 vol. %) to prevent the aforementioned agglomeration and particle-to-particle contact. At desiccant loading levels below 25-30 vol. %, discrete desiccant particles do not touch each other and therefore can not facilitate moisture transport therebetween. Hence, moisture transport occurs primarily through the contiguous polymer matrix and is therefore controlled by the water vapor transport properties of the matrix polymer. However, it should be noted that the volumetric loading of desiccant is chosen to be the maximum possible loading within the previously described constraints in order to attain the maximum moisture adsorbing capacity of the composite, and that high volumetric loading also serves to prevent water molecules from bypassing the desiccant particles during diffusion across the composite barrier.

Figure 9:
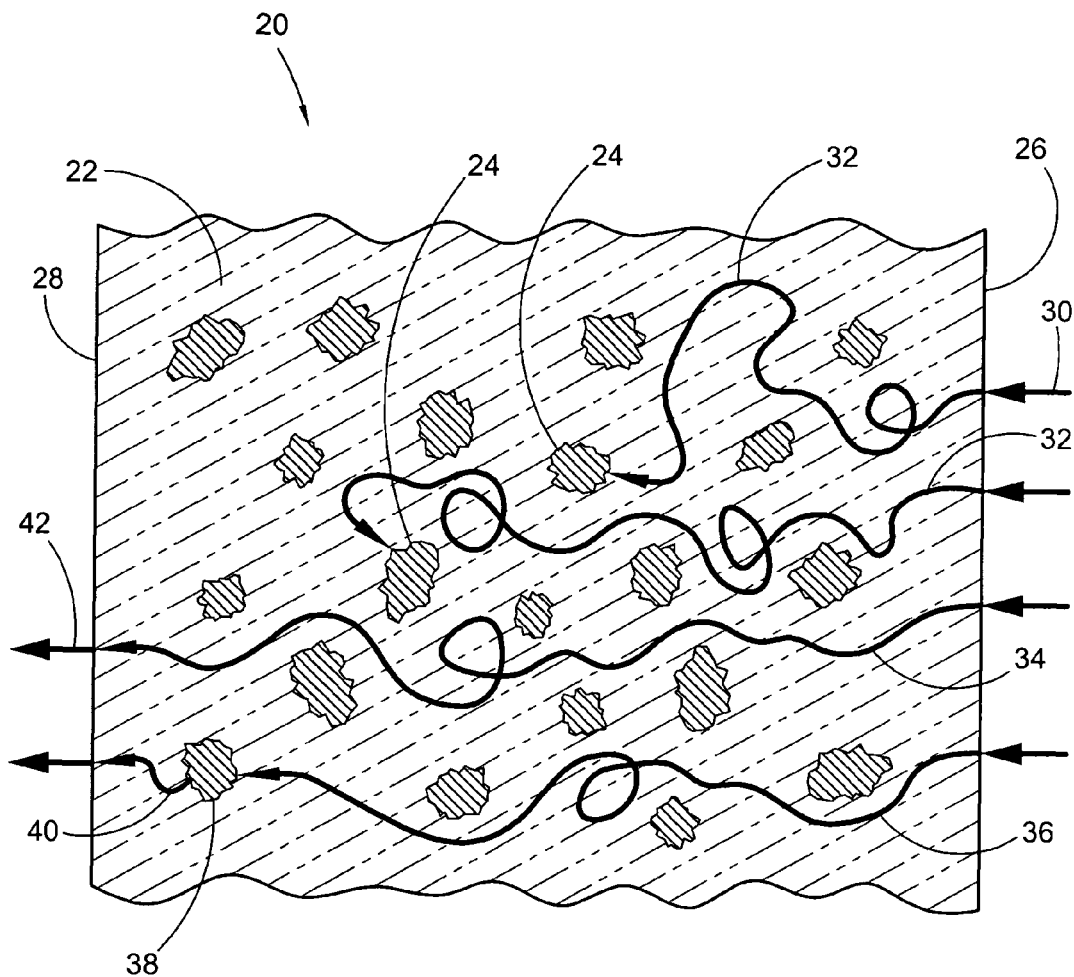

An example of such a polymer matrix is shown in FIG. 9. Polymer matrix 20 comprises contiguous resin 22 and sorbent particles 24. As can be seen in the figure, each individual sorbent particle 24 is separated from each other particle 24 by resin 22. Matrix 20 includes external surface 26 and internal surface 28. Water vapor adjacent to external surface 26 enters matrix 20, for example, according to unidirectional arrow 30. Prior to saturation of sorbent particles 24, water vapor may, for example, progress within matrix 20 according to unidirectional arrows 32 and such vapor is eventually absorbed by sorbent particles 24. Subsequent to saturation of sorbent particles 24, water vapor may progress through matrix 20 according to unidirectional arrow 34, or according to unidirectional arrow 36 which water vapor is absorbed by sorbent particle 38 and subsequently released from particle 38 according to unidirectional arrow 40. Any water molecules, i.e., water vapor, which reach internal surface 28 may exit from matrix 20, for example, according to unidirectional arrow 42.

Means of particle dispersion and essential separation from each other within the matrix, such as mixing and compounding procedures, details of polymer and desiccant preparation for compounding, feeding and processing conditions during compounding, potential use of compatibilizing agents and processing aids to stabilize highly loaded composite morphologies, etc., also form part of this invention. It has been found that microscopic interfacial gaps and defects between the desiccant particles and polymer matrix commonly arising from the thermodynamic incompatibility of the resin and the dispersed desiccant particles are preferably reduced or eliminated through the use of suitable compatibilizing agents in the resin-sorbent composite; however, it should be appreciated that only the minimum suitable amount of compatibilizing agent is used in order to prevent agglomeration and to minimize other interactions of compatibilized desiccant particles such as formation of microchannels connecting particles, and to essentially prevent formation of pores, holes and microcracks in the composite during cooling. Microcrack formation in the contiguous polymer phase is often observed in highly filled polymer composites upon cooling as a result of nonuniform shrinkage of the polymer constrained by the loaded sorbent particles and such defects may lead to a significant increase in moisture permeation rates through the composite. Thus, the choice of controlled cooling regimes and suitable compatibilizers allows for the reduction of the formation of such microcracks in parts manufactured from the present invention resin bonded sorbent composites. The selection of processing aids and additives to achieve the desired particle dispersion in a composite accounts for the fact that such additives should not promote or facilitate moisture diffusion around the desiccant particles and from one particle to another, e.g., along the compatibilized interfaces and through overlapping boundary layers around each particle, but rather serve only to stabilize the composite morphology and to prevent blocking of moisture permeation to the particles. As such, the compatibiling agents are chosen to provide close or essentially identical moisture vapor permeability to that of the polymer matrix.

Generally, sorbents which are useful and functional in this invention are those which bond mechanically to the resin without special additives, such as molecular sieve, as previously discussed. Still others, according to the instant invention, can be induced to bond to the resin through use of a suitable additive, i.e., bind with the aid of a coupling or compatibilizing agent. In addition to molecular sieve, other representative sorbents that are useful in the compositions of the invention include silica gel, activated carbon, activated alumina, clay, other natural zeolites, and combinations thereof. Those sorbents found to perform with coupling or compatibilizing agents include such members as activated carbon and alumina.

The additives which perform as compatibilizers fall into either of two categories, namely those which bond with the resin or the sorbent, and those having some affinity with both resin and sorbent, and act as solid state surfactants. Reactive coupling agents include such classes as maleates, epoxies and silanes. More specifically, reactive coupling agents include such representative examples as maleic anhydride grafted polymers used in amounts ranging from about 2 to about 5% by weight. In particular, they can include such representative examples as maleic anhydride grafted to polypropylene or ABS resins, the latter being useful as coupling agents with styrenic polymers. Similarly, silanes with various functional groups attached may be used.

The present invention also contemplates the use of so called non-reactive type compatibilizing agents in binding sorbent and resin. This comprises such representative examples as metals (e.g., zinc or sodium), metal oxides, organo-metallic ligands, acrylates, stearates and block copolymers, e.g., zinc stearate, sodium stearate in a range from about 0.01 to about 0.2% by weight based of the sorbent. The actual level is driven by the surface area, which is in-turn proportional to the particle size. For a molecular sieve with mean particle size of 10 $\mu$m, 100 ppm of aluminum stearate would be a typical starting level for compatibilization with a polyamide resin. With both reactive and non-reactive coupling/compatibilizing agents, their incorporation within the resin matrix is believed not to create phase boundaries.

The resin bonded sorbent compositions may be prepared in accordance with the present invention using thermoplastic compounding techniques generally familiar among ordinary skilled artisans. Molecular sieve, a preferred sorbent, may be incorporated into the resin, e.g., polyamide, polyolefin, or the like, by feeding the sorbent in powdered format along with beads of the chosen resin to a plastics extruder with good mixing characteristics. Although single-screw extruders may be used to compound a resin and sorbent, a resin and sorbent blend normally needs to be double-compounded in order to produce a suitable resin bonded sorbent material. Even after double compounding, reagglomeration and phase separation sometimes occurs during further processing. It has been found that resin bonded sorbent materials compounded with twin-screw extrusion equipment with extensive back mixing is needed to attain nearly complete dispersion of the sorbent and develop the superior mechanical and physical characteristics which are an object of this invention. In other words, resin bonded sorbent materials formed via a twin-screw extruder show little or no migration of sorbent within the resin matrix and thus these resin bonded sorbent materials maintain a homogeneous appearance. Therefore, twin-screw extruder compounding is typically used to form resin bonded sorbent materials of the present invention, as the resin is melted and the sorbent mixed throughout. It is usually advantageous that the resin be heated above its melting point as determined by DSC (differential scanning calorimetry) before the sorbent is added. That is, in preparing the resin bonded sorbents of the invention, the temperature should be raised to the point where all crystallinity is lost in order to achieve complete miscibility of the sorbent in the resin melt. For example, DuPont's Zytel® 101 polyamide resin would be heated above 262° C. The extruded resin is cooled and then cut or crushed into pellets or granules. Because compounding is performed at elevated temperatures, the sorbent tends not to adsorb moisture during this processing period, but retains its adsorption capacity when molded into a component part and installed in a working environment.

One further advantage realized with the resin bonded sorbent system of the present invention, wherein the resin and sorbent are intimately bonded, is that gram for gram it is more effective than adsorbent systems employing a bagged adsorbent, i.e., adsorbent capacity per unit volume. According to earlier methods wherein bags were used for containerizing sorbent, the sorbent required beading to prevent it from entering the refrigerant stream, for example. This required the sorbent to be bonded within a binder resin, typically 15 wt % binder, such as in the form of a powder. Thus, when 40 grams of a commercially prepared sorbent was placed into a bag, in reality only 34 grams of sorbent were introduced into the system (with 6 grams of binder). In contradistinction, the resin bonded sorbents of the present invention require no additional binder resin because the sorbent is placed directly into the molding resin from which the components are fabricated. Advantageously, with the immediate invention, no intermediary binder resin is required, allowing for higher sorbent loading factors than otherwise achieved with the usual bagged sorbents.

It should be appreciated that the duration of the reduced water vapor permeation rates through the described composite barriers, both absorbing and chemically reactive, is determined by the so called lag time of the barrier. For chemical absorbers, the lag time depends on the stoichiometric reactive capacity of the barrier material. For physical absorbers, the lag time is controlled by the moisture absorbing capacity of the desiccant used, its loaded fraction, and the form of its water vapor sorption isotherm. Unlike chemical absorbers whose reactive capacity has to be completely depleted across the barrier thickness before the barrier starts to "leak", the physical absorbers are not fully saturated when permeation resumes across the barrier filled with them. The composite structure continues to work as an absorbing barrier even after the steady-state water vapor transport is established across the barrier. As such it reduces the rate of water vapor accumulation in the package due to a need to saturate an additional sorbent fraction as the humidity level inside the package increases.

It has been found that the present invention method provides a means of creating highly filled polymer composites which, due to the high desiccant loading levels, exhibit significantly reduced warping and shrinking upon cooling, and thus provide a means to produce thicker structural parts within tight manufacturing tolerances. Such composites can be used as structural molding resins for manufacturing single layer rigid packaging and encapsulating articles in a variety of applications. Moreover, impact-modified grades of the disclosed composites may be prepared by the addition into the resin-sorbent matrix of a dispersed elastomeric phase, e.g., thermoplastic rubber, having low moisture permeability. Additionally, the present invention method may be used to create resin-sorbent composites which can form a high moisture barrier coating on the exterior of a packaging article in order to extend its usable service time, i.e., the duration of barrier improvement.

It should be appreciated that prior to the present invention, packaging and/or enclosures where assumed to have failed based upon the calculation of lag time alone. However, most contents within such enclosures could withstand internal relative humidity levels above zero percent (0%), in fact some contents could even withstand relative humidity levels in excess of sixty percent (60%). Thus, by assuming the enclosure was breached once the lag time was reached, extended periods of time where the contents would still be safe were lost, resulting in shortened service life predictions or alternative enclosure designs with increased costs. In view of the foregoing, the present invention provides a means to accurately determine the increase in internal relative humidity within such enclosures over extended periods of time. As one of ordinary skill in the art recognizes, it is not practical to merely test such enclosures at elevated humidity levels because the testing can take years and there are no reasonable methods of accelerating such testing. Therefore, the present invention method provides information regarding the performance of such enclosures without the need for prolonged, impractical testing.

The present invention method provides a means to determine from a group of resins and sorbents, which compositions of resins and sorbents will meet design requirements, for example, humidity ingress within an enclosure made from such compositions and overall part cost. The method includes the steps of: a) selecting a plurality of resins, a plurality of sorbents and a plurality of ratios therebetween to form a plurality of composites; b) calculating a plurality of failure times for the plurality of composites, wherein each failure time of the plurality of failure times is based on when an internal relative humidity $h_{in}$ of each composite of the plurality of composites is equal to the maximum internal relative humidity (See discussion above regarding the various methods of calculating the internal relative humidity); c) determining which of the plurality of failure times is greater; and, d) selecting one composite of the plurality of composites based on the result of step (c). By performing the foregoing method, a resin bonded sorbent composition may be selected that most closely matches the enclosure design requirements.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A method of selecting an appropriate resin bonded sorbent composition which may be used at least for in part making an enclosure to protect contents from external humidity, wherein said enclosure has an internal headspace volume V, a thickness L and a surface area A, said enclosure surrounded by an environment having an external relative humidity $h_{out}$ which is a fraction of a saturated water vapor density $\rho_{sat}$ at a temperature T, said internal volume having a maximum internal relative humidity, said method comprising the steps of:
    a) selecting a plurality of resins, a plurality of particulate sorbents and a plurality of ratios therebetween to form a plurality of composites, wherein each resin of said plurality of resins has an effective water vapor diffusivity $D_m$ and a water vapor solubility coefficient $S_m$ and each composite of said plurality of composites has a volume fraction of said resin $\phi_m$ and a volume fraction of said sorbent $\phi_d$;
    b) calculating a plurality of failure times for said plurality of composites, wherein each failure time of said plurality of failure times is based on when an internal relative humidity $h_{in}$ of each composite of said plurality of composites is equal to said maximum internal relative humidity;
    c) determining which of said plurality of failure times is greater; and,
    d) selecting one composite of said plurality of composites based on the result of step (c).

2. The method of selecting a resin bonded sorbent composition of claim 1, wherein each particulate sorbent of said plurality of particulate sorbents is stoichiometric and each composite of said plurality of composites has a stoichiometric coefficient $\mu$, an initial mass concentration $R_0$ and a concentration $C_{out}$ of water vapor dissolved at an external surface, said internal relative humidity after a lag time $t_{LR}$ is calculated according to the equation:

$$h_{in}(t) = h_{out}\left[1 - \exp\left(-\frac{\phi_m D_m S_m A(t - t_{LR})}{L\left(\rho_{sat} V + \frac{1}{2}\phi_m S_m AL\right)}\right)\right],$$

wherein: t is a time to reach said internal relative humidity $h_{in}$; and, $t_{LR}$ is said lag time of said enclosure having said thickness L.

3. The method of selecting a resin bonded sorbent composition of claim 2, wherein said lag time is calculated according to the equation:

$$t_{LR} = \frac{L^2}{6D_m}(1 + 3\Psi),$$

wherein:

$$\Psi = \frac{\mu R_0}{C_{out}}.$$

4. The method of selecting a resin bonded sorbent composition of claim 1, wherein each particulate sorbent of said plurality of particulate sorbents has a water vapor sorption isotherm, said water vapor isotherm is linear and has a water vapor solubility coefficient $S_d$, and each composite of said plurality of composites has a pseudo stoichiometric coefficient μ, an initial mass concentration $R_0$ and a concentration $C_{out}$ of water vapor dissolved at an external surface, said internal relative humidity after a lag time $t_{LL}$ is calculated according to the equation:

$$h_{in}(t) = h_{out}\left[1 - \exp\left(-\frac{\phi_m D_m S_m A(t - t_{LL})}{L\left(\rho_{sat} V + \frac{1}{2}S_{eff} AL\right)}\right)\right],$$

wherein: t is a time to reach said internal relative humidity $h_{in}$;

$t_{LL}$ is said lag time of said enclosure having said thickness L; and, $$S_{eff} = \phi_m S_m + \phi_d S_d.$$

5. The method of selecting a resin bonded sorbent composition of claim 4, wherein said lag time is calculated according to the equation:

$$t_{LL} = \frac{L^2}{6D_m}(1 + \Psi h_{out}),$$

wherein:

$$\Psi = \frac{\mu R_0}{C_{out}}.$$

6. The method of selecting a resin bonded sorbent composition of claim 1, each particulate sorbent of said plurality of particulate sorbents has a water vapor sorption isotherm, said water vapor sorption isotherm is dual sorption mode and has a hole saturation constant $C_{max}$, a Langmuir affinity constant b, and said internal volume has an initial internal relative humidity $h_{in,0}$, said internal relative humidity after a lag time $t_{LD}$ is calculated according to the equation:

$$t = t_{LD} + \frac{a_1 a_3}{a_5(1 + bh_{out})}\left[\ln\frac{1 + bh_{in}}{1 + bh_{in,0}} - \ln\frac{h_{out} - h_{in}}{h_{out} - h_{in,0}} - \ln(1 + bh_{out})\left(\frac{1}{1 + bh_{in}} - \frac{1}{1 + bh_{in,0}}\right)\right] - \frac{a_2 a_3 + a_4}{a_5}\ln\frac{h_{out} - h_{in}}{h_{out} - h_{in,0}},$$

wherein: t is a time to reach said internal relative humidity $h_{in}$;

$t_{LD}$ is said lag time of said enclosure having said thickness L;

$$a_1 = \phi_d C_{max} b;$$

$$a_2 = \phi_m S_m;$$

$$a_3 = \frac{AL}{2};$$

$$a_4 = \rho_{sat} V;$$

and, $$a_5 = \frac{\phi_m D_m S_m A}{L}.$$

7. The method of selecting a resin bonded sorbent composition of claim 6, wherein said lag time is calculated according to the equation:

$$t_{LD} = \frac{L^2}{6D_m}\left(1 + \frac{\phi_d}{\phi_m}\frac{C_{max} b}{S_m}\frac{6}{y^3}\left[\frac{1}{2}y^2 + y - (1 + y)\ln(1 + y)\right]\right),$$

wherein: $y = bh_{out}$.

8. The method of selecting a resin bonded sorbent composition of claim 1 wherein said resin bonded sorbent composition is formed with the aid of a coupling agent or a compatibilizing agent, wherein the coupling agent or compatibilizing agent is chemically compatible with each resin of said plurality of resins and improves adhesion or coupling of each particulate sorbent of said plurality of particulate sorbents with each resin of said plurality of resins.

9. The method of selecting a resin bonded sorbent composition of claim 8 wherein said coupling or compatibilizing agent is selected from the group consisting of reactive and non-reactive agents.

10. The method of selecting a resin bonded sorbent composition of claim 9 wherein said compatibilizing agent is selected from the group consisting of a metal, a metal oxide, an acrylate, a stearate, a block copolymer, a maleate, an epoxy, a silane, a titanate, an organo-metal ligand and mixtures thereof.

11. The method of selecting a resin bonded sorbent composition of claim 1 wherein said resin bonded sorbent composition is compounded in a twin screw extruder.

* * * * *